US006961338B2

(12) United States Patent
Nabesako et al.

(10) Patent No.: US 6,961,338 B2
(45) Date of Patent: Nov. 1, 2005

(54) DEMULTIPLEXER FOR HANDLING DIFFERENT MULTIPLEXED DATA FORMATS

(75) Inventors: Hideki Nabesako, Tokyo (JP); Osamu Yagi, Tokyo (JP)

(73) Assignee: Sony Corporation, Tokyo (JP)

( * ) Notice: Subject to any disclaimer, the term of this patent is extended or adjusted under 35 U.S.C. 154(b) by 898 days.

(21) Appl. No.: 09/840,412

(22) Filed: Apr. 23, 2001

(65) Prior Publication Data

US 2002/0003816 A1 Jan. 10, 2002

(30) Foreign Application Priority Data

Apr. 25, 2000 (JP) ............................ 2000-124795

(51) Int. Cl.[7] .............................................. H04L 12/28
(52) U.S. Cl. ...................................... 370/392; 370/429
(58) Field of Search ............................... 370/452, 536, 370/429, 358, 391, 394, 392, 428, 493–495, 370/542–544, 374, 390, 229, 535; 348/460, 348/441, 705, 49, 390, 726, 423; 10/316; 395/704, 306; 714/38; 364/716; 375/368; 380/20

(56) References Cited

U.S. PATENT DOCUMENTS 5,282,153 A * 1/1994 Bartkowiak et al. ........ 708/233
5,299,320 A * 3/1994 Aono et al. ................. 712/231
5,365,519 A * 11/1994 Kozaki et al. .............. 370/378
5,488,736 A * 1/1996 Keech et al. ............... 711/114
5,572,522 A * 11/1996 Calamvokis et al. ....... 370/390
5,602,920 A * 2/1997 Bestler et al. .............. 380/212
5,610,914 A * 3/1997 Yamada ................. 370/395.72
5,761,453 A * 6/1998 Anderson et al. ........... 710/308
5,835,591 A * 11/1998 Cochon et al. ............. 380/212
5,898,687 A * 4/1999 Harriman et al. ........... 370/390
5,923,755 A * 7/1999 Birch ......................... 380/212
5,950,222 A * 9/1999 Yamada et al. ............. 711/103
5,983,018 A * 11/1999 Kanzaki ..................... 717/127
6,097,721 A * 8/2000 Goody ........................ 370/379
6,115,356 A * 9/2000 Kalkunte et al. ........... 370/229
6,201,815 B1 * 3/2001 Nomura ...................... 370/429
6,269,107 B1 * 7/2001 Jong .......................... 370/535
6,275,507 B1 * 8/2001 Anderson et al. ........... 370/487
6,362,990 B1 * 3/2002 Gibson et al. ................ 365/49
6,393,082 B1 * 5/2002 Nakamura .................. 375/368
6,414,726 B1 * 7/2002 Chauvel ..................... 348/726
6,463,059 B1 * 10/2002 Movshovich et al. ....... 370/389
6,728,255 B1 * 4/2004 Tzeng ........................ 370/428
6,768,716 B1 * 7/2004 Abel et al. .................. 370/230
6,778,533 B1 * 8/2004 Kovacevic et al. ......... 370/392

* cited by examiner

*Primary Examiner*—Bob Phunkulh
*Assistant Examiner*—Ian N. Moore
(74) *Attorney, Agent, or Firm*—Frommer Lawrence & Haug LLP; William S. Frommer; Darren M. Simon

(57) ABSTRACT

A demultiplexer for separating different format packets from a multiplexed data stream. Each packet format has a different type of header which is analyzed based on micro-codes read out in sequence from a command memory. By using micro-codes, the demultiplexer minimizes the circuitry required to process multiple formats (e.g. digital video broadcasting (DVB), digital satellite system (DSS), and digital versatile disc (DVD)). The packets are separated and sent to their respective destinations based on the packet ID read from each header.

13 Claims, 25 Drawing Sheets

| | | |
|---|---|---|
| PACKET ID 0 | CONTINUITY COUNT 0 | DESTINATION 0 |
| PACKET ID 1 | CONTINUITY COUNT 1 | DESTINATION 1 |
| PACKET ID 2 | CONTINUITY COUNT 2 | DESTINATION 2 |
| PACKET ID 3 | CONTINUITY COUNT 3 | DESTINATION 3 |
| ⋮ | ⋮ | ⋮ |

FIG. 19

PRIOR ART

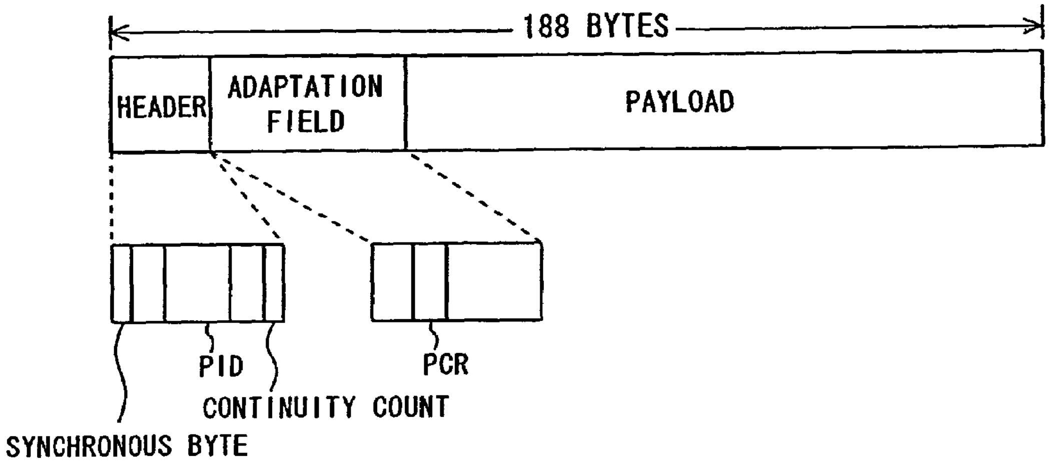

FIG. 20

PRIOR ART

| ITEM | BITS | REMARK |
|---|---|---|
| sync_byte | 8 | IF NOT 0x47, PACKET IS DISCARDED. |
| transport_error_indicator | 1 | WHEN '1', PACKET IS DISCARDED. |
| payload_unit_start_indicator | 1 | WHEN '1', PES OR PSI HEADER IS CONTAINED. |
| transport_priority | 1 | IGNORED |
| PID | 13 | COMPARE WITH PID FILTER |
| transport_scrambling_control | 2 | WHEN NOT '00', PACKET IS DISCARDED. |
| adaptation_field_cotrol | 2 | WHEN '00', PACKET IS DISCARDED. WHEN '10' OR '11', "adaptation_field" IS CONTAINED. |
| continuity_counter | 4 | WHEN NOT CONTINUOUS, PACKET IS DISCARDED. |

FIG. 21

PRIOR ART

| ITEM | BITS | REMARK |
|---|---|---|
| adaptation_field_length | 8 | length OF "adaptation_field" |
| discontinuity_indicator | 1 | IGNORED |
| ramdom_access_indicator | 1 | IGNORED |
| element_stream_indicator | 1 | IGNORED |
| PCR_flag | 1 | WHEN '1', "adaptation_field" CONTAINS PCR. |
| PCR_base | 33 | LATCH TO PLL |
| PCR_extension | 9 | LATCH TO PLL |

FIG. 22

PRIOR ART

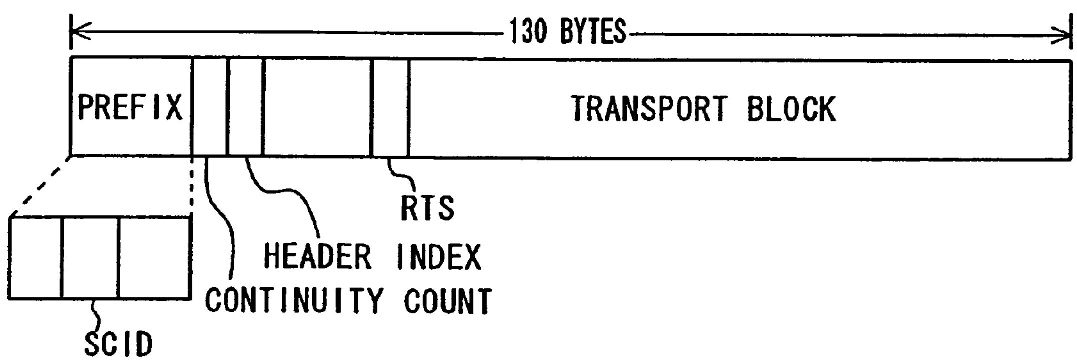

FIG. 23

PRIOR ART

| ITEM | BITS | REMARK |
|---|---|---|
| Packet Framing | 1 | TOGGLE TO '0' OR '1' WHENEVER PACKET IS RECEIVED. |
| Bundle Boundary | 1 | IGNIRED |
| Control Flag | 1 | WHEN '0', PACKET IS DISCARDED. |
| Control Sync | 1 | IGNIRED |
| Service Channel ID | 12 | COMPARE WITH PID FILTER. |

FIG. 24

PRIOR ART

| ITEM | BITS | REMARK |
|---|---|---|
| Continuity Counter | 4 | WHEN NOT CONTINUOUS, PACKET IS DISCARDED. |
| Header Designator | 4 | INDICATES THE TYPE OF VIDEO APPLICATION PACKET. |

FIG. 25

PRIOR ART

| ITEM | BITS | REMARK |
|---|---|---|
| Modifiable Flag | 1 | IGNORED |
| Current Field Flag | 1 | WHEN '0', PACKET IS DISCARDED. |
| Aux Field ID | 6 | INDICATES THE TYPE OF DATA. |
| Auxiliary Field Size | 8 | INDICATES THE SIZE OF AUXILIARY DATA BLOCK. |

FIG. 27

PRIOR ART

| ITEM | BITS | REMARK |
|---|---|---|
| PES_start_code_prefix | 24 | CARRIES 0x000001 |
| stream_id | 8 | IDENTIFIES THE TYPE OF ELEMENT STREAM |
| PES_packet_length | 16 | INDICATE THE LENGTH OF PES PACKET |
| PES_header_data_length | 8 | INDICATE THE LENGTH OF PES HEADER |

FIG. 28

PRIOR ART

| ITEM | BITS | REMARK |
|---|---|---|
| pack_start_code | 32 | CARRIES 0x000001BA AS START CODE |
| syetem_clock_reference_base | 33 | LATCH TO PLL |
| system_clock_reference_extension | 9 | LATCH TO PLL |

FIG. 29

PRIOR ART

| ITEM | BITS | REMARK |
|---|---|---|
| system_header_start_code | 32 | CARRIES 0x000001BB AS START CODE |
| header_length | 8 | INDICATES THE LENGTH OF SYSTEM HEADER |

DEMULTIPLEXER FOR HANDLING DIFFERENT MULTIPLEXED DATA FORMATS

BACKGROUND OF THE INVENTION

1. Field of the Invention

The present invention relates to a demultiplexer capable of separating desired packets from (a bit stream of) input digital data which has different types of packets multiplexed by a specific multiplexing method. More particularly, it relates to a demultiplexer provided with a command memory in which micro-codes are stored for controlling the action of each components in response to the micro-codes read out in a sequence from the command memory. As a result, the demultiplexer can handle different type of the multiplexing format through modifying the micro-codes read from the command memory, thus decreasing the overall size of its circuit and the overall cost.

2. Description of the Related Art

In general, video, audio, text, and other contents of digital data for the broadcasting and the storage mediums are encoded and multiplexed through grouping into packets or packs before transmitted and stored in the form of a stream of bits. When the packets in the received data are identical in the encoding format but different the multiplexing format, the receiver has to prepare a plurality of demultiplexers for the different types of the multiplexing format.

For example, the technologies of DVB (digital video broadcasting), DSS (digital satellite system), and DVD (digital versatile disc) are different from each other in the multiplexing format.

FIG. 19 illustrates a common structure of the DVB packet in a DVB stream. The DVB packet comprises a header of 4 bytes, an adaptation field of a variable length, and a payload of a variable length (a data field) and its total length is 188 bytes. As well known, the payload contains PES (packetized elementary stream) packets separated again and assigned as well as various table of PSI (program specific information) in the form of sections determined by the MPEG2 system. The DVB packet may be composed of either the adaptation field or the payload. The header contains a PID (packet identification) data for the packet identification, while the adaptation field contains a PCR (program clock reference) data as the timing information.

FIG. 20 shows the contents of the header in the DVB packet. "Sync_byte" is 0×47. When "transport_error_indicator" is 1, it indicates that the packet has an error. When "payload_unit_start_indicator" is 1, it indicates that the payload in the packet is marked with the PES or PSI header. When "transport_scrambling_control" is 00, it indicates that the packet is not scrambled. When the upper bit in "adaptation_field_control" is 1, it indicates that the packet contains the adaptation field. When the lower bit in the same is 1, it indicates that the packet contains the payload. "Continuity_counter" is provided for examining whether or not more than one of packets having the same PID data are arranged consecutively.

FIG. 21 illustrates the major contents of the adaptation field. "adaptation_field_length" indicates the length of the adaptation field. When "adaptation_field_control" is 10, 0×B7 (=183) is established. When "PCR_flag" is 1, it indicates that the adaptation field contains a PCR data as the timing information.

FIG. 22 illustrates a common structure of the DSS packet in a DSS bit stream. The DSS packet comprises a prefix of 2 bytes and a transport block of 128 bytes and its total length is 130 bytes. The prefix contains a SCID (service channel identification) data for the packet identification while the transport block contains the timing information.

FIG. 23 shows the major contents of the prefix in the DSS packet. "Packet Framing" is tuned to 0 or 1 alternately in each packet. When the packet is scrambled, "Control Flag" is 0. If not, 1. FIG. 24 illustrates one byte of a CC field and an HD field after the prefix. "Continuity Counter" is provided for examining whether or not more than one of packets having the same SCID are arranged consecutively. "Header Designator" is provided for indicating the type of a video application packet.

For example, when the packet is an Auxiliary Data packet, "Header Designator" is 0000. Simultaneously, "Continuity Counter" is 0000. FIG. 25 shows 2 bytes after the CC field and the HD field in that case. When "Current Field Flag" is 1, it indicates that the Auxiliary Data packet is valid. "Aux Field ID" indicates what is contained in the Auxiliary Data packet. When 000000, the Auxiliary Data packet contains 5 bytes of a RTS (reference time stamp) data as the timing information. When 000011, the same packet contains the RTS data and an "Encryption Control Word Packet".

FIG. 26 illustrates a common structure of the DVD pack in a DVD bit stream. The DVD pack comprises a pack header of a variable length, a system header of a variable length, and a PES packet of a variable length and its overall length is variable. The PES header contains a stream ID as the packet ID and the pack header contains a SCR (system_clock_reference) data as the timing information.

FIG. 27 illustrates the major contents of the PES header. "PES_start_code_prefix" is always 0×000001, indicating the start of the PES header. "PES_packet_length" indicates the length of the succeeding PES packet. "PES_header_data_length" indicates the length of "optical PES header" following "stream_ID".

FIG. 28 illustrates the major contents of the DVD pack header. "pack_start_code" is 0×000001BA. "system_clock_Reference_base" and "system_clock_Reference_extension" are the timing information. The system header follows the pack header of the first pack. FIG. 29 shows the major contents of the system header.

As the multiplexing formats are different, the construction of the streams, the contents of the headers, and the other settings become non-uniform. Accordingly, the header analysis and the payload transmission have to be modified depending on the multiplexing format.

FIG. 30 illustrates an arrangement of a demultiplexer 200 designed for separating desired packets for output from a bit stream of input digital data which has different types of packets multiplexed.

The demultiplexer 200 comprises an input terminal 201 for receiving a bit stream STM, a header analyzer 202 for analyzing the header of each packet or pack contained in the bit stream STM using a sequencer, an output destination determining unit 203 for determining the destination of outputting each packet, and a system clock controller 204 for controlling a system clock with the timing information extracted from the bit stream STM in the header analyzer 202.

The output destination determining unit 203 has a built-in memory (not shown) thereof provided in which packet ID data have been registered for identifying the packets to be extracted from the bit stream STM. The packet ID may be received via a host interface 205 from an external CPU. When it is found by the header analyzer 202 that the packet ID extracted from a packet matches the packet ID stored in the built-in memory, the output destination determining unit 203 determines a destination identified by the stored packet ID as the destination of the packet having the extracted packet ID.

The demultiplexer 200 also includes a separator 206 for separating the destined packets from the bit stream STM and transferring them to the destination. The separator 206 may be connected to a set of output terminals 207*a*, 207*b*, 207*c*, and so on as the destinations.

When the bit stream STM is of the DVB format, the demultiplexer 200 shown in FIG. 30 carries out a procedure of packet processing shown in the flowchart of FIG. 31.

The procedure starts with receiving a DVB packet at Step ST11 and detecting a synchronous byte "sync_byte" in the packet at Step ST12. At Step ST13, the header is examined at "transport_error_indicator", "transport_scrambling control", "adaption_field_control", and the like whether or not they contain any error. If not, the procedure goes to Step ST14.

At Step ST14, it is examined whether the PID data in the header is identical to the PID data stored in the built-in memory of the output destination determining unit 203. When the PID data in the header is identical to the one stored, a continuous index "continuity_counter" in the header is examined at Step ST15 whether or not the continuity of the packets is established. When so, the procedure advances to Step ST16.

At Step ST16, it is examined whether the PCR data as the timing information is contained or not. When the timing information is contained, the procedure goes to Step ST17. At Step ST17, the timing information is extracted from the packet and transferred to the system clock controller 204. This is followed by Step ST18. If the timing information is not found, the procedure jumps to Step ST18. At Step ST18, the payload in the packet is transmitted to the destination determined by the PID data of the header before repeating the procedure for the succeeding DVB packet.

When it is found at Step ST13 that the header contains an error, the PID data of the header is not identified at Step ST14, and the continuity is not found at Step ST15, the packet is discarded at Step ST19 before repeating the procedure for the next DVB packet.

When the bit stream STM is of the DSS format, the demultiplexer 200 shown in FIG. 30 carries out a procedure shown in the flowchart of FIG. 32.

The procedure starts with receiving a DSS packet at Step ST21 and detecting a synchronous signal in the packet at Step ST22. At Step ST23, the prefix is examined for error bits (in "control_flag" or the like). If no error is found, the procedure goes to Step ST24.

At Step ST24, it is examined whether the SCID data in the prefix is identical to the SCID data stored in the built-in memory of the output destination determining unit 203. When the SCID data in the prefix is identical, "continuity_counter" in the prefix is examined at Step ST25 whether or not the continuity of the packets is established. When so, the procedure advances to Step ST26.

At Step ST26, it is examined whether the RTS (reference time stamp) data as the timing information is contained or not. When the timing information is contained, the procedure goes to Step ST27. At Step ST27, the timing information is extracted from the packet and transferred to the system clock controller 204. This is followed by Step ST28. If the timing information is not found, the procedure jumps to Step ST28. At Step ST28, the transport block in the packet is transmitted to the destination determined by the SCID data of the prefix before repeating the procedure for the succeeding DSS packet.

When it is found at Step ST23 that the prefix contains an error, the SCID data is not identified at Step ST24, and the continuity is not found at Step ST25, the packet is discarded at Step ST29 before repeating the procedure for the next packet.

When the bit stream STM is of the DVD format, the demultiplexer 200 shown in FIG. 30 carries out a procedure shown in the flowchart of FIG. 33.

The procedure starts with receiving a DVD pack at Step ST31 and detecting a start code "pack_start_code" in the packet at Step ST32. At Step ST33, the SCR data is extracted as the timing information from the pack header and transmitted to the system clock controller 204. Then, the procedure goes to Step ST34.

At Step ST34, it is examined whether the pack is the first pack or not. When so, the system header is transmitted to the corresponding destination at Step ST35 and then, the procedure advances to Step ST36. If not the first pack, the procedure jumps to Step ST36.

At Step ST36, each PES packet is extracted and transmitted to the destination determined by the Stream ID in the header before repeating the procedure for the next pack.

As described above, for handling the signals of the different multiplexing formats which are different in the construction of a bit stream and the analyzing process of each header, a corresponding number of the demultiplexers 200 are needed. Accordingly, the hardware circuitry arrangement for handling the different type of the multiplexing format with their dedicated circuits will be increased in the overall size and the production cost.

SUMMARY OF THE INVENTION

It is hence an object of the present invention to provide a demultiplexer capable of handling different types of the multiplexing format and decreasing the size and the cost of its overall circuit arrangement.

A demultiplexer for separating desired packets for output from an input digital data which has different format packets multiplexed in a given manner is provided comprising: a data input for receiving the input digital data; a first storage (a shift register) for storing and transferring the input digital data received at the data input; a second storage (a group of shift registers) for extracting and storing the headers of the packets from the input digital data stored in the first storage (a shift register); a calculating unit for analyzing the headers of the packets stored in the second storage (a group of shift registers); an output destination determining unit for determining the destination of the packets from a packet identifier which is contained in the headers of the packets stored in the second storage (a group of shift registers); a separator arranged responsive to a result of the calculating action of the calculating unit and an output of the output destination determining unit for separating the desired packets from the input digital data received from the first storage (a shift register); a command memory for storing micro-codes provided for selecting a controlling action in each multiplexing format; a counter for determining an execution address of the micro-code stored in the command memory; a controller for controlling the action of each component with the micro-code read out from the command memory by the execution address determined by the counter; and a system clock counter for extracting the timing data from the input digital data stored in the first storage (a shift register) and controlling a system clock with the timing data.

In this embodiment, the command memory is provided for storage of the micro-codes. The micro-codes are read out in a sequence from the command memory and used for controlling the action of each component to separate desired packets from the input digital data and transfer them to the corresponding destinations. Accordingly, the different types of the multiplexing format can be handled by having a corresponding one of the micro-codes read out from the command memory, hence contributing to the reduction and the cost down of the circuitry arrangement of the demultiplexer.

BRIEF DESCRIPTION OF THE DRAWINGS

FIG. 19 is a diagram showing a structure of the DVB packet;

FIG. 20 is a diagram showing major contents of the header in the DVB packet;

FIG. 21 is a diagram showing major contents of the adaptation field;

FIG. 22 is a diagram showing a structure of the DSS packet;

FIG. 23 is a diagram showing major contents of the prefix in the DSS packet;

FIG. 24 is a diagram showing a structure of a one-byte CC/HD field following the prefix in the DSS packet;

FIG. 25 is a block diagram showing a two-byte structure of an auxiliary data packet following the CC/HD field;

FIG. 27 is a diagram showing major contents of the PES header;

FIG. 28 is a diagram showing major contents of the DVD pack header;

FIG. 29 is a diagram showing major contents of the system header;

FIG. 32 is a flowchart showing a procedure of processing the DSS packets.

DESCRIPTION OF THE PREFERRED EMBODIMENT

Some embodiments of the present invention will be described referring to the relevant drawings.

For ease of the description, unless otherwise specified, the header of a DVB packet, the prefix of a DSS packet, and the header of a DVD pack are referred to as headers hereinafter. Also, the packet identifier PID of a DVB packet, the packet identifier SCID of a DSS packet, and the packet identifier Stream ID of a PES packet in a DVD pack are referred to as packets ID. The timing data PCR of a DVB packet, the timing data RTS of a DSS packet, and the timing data SCR of a DVD pack are referred to as timing data. The payload of DVB packet, the transport block of a DSS packet, and the PES packet of a DVD pack are referred to as payloads.

Figure 1:
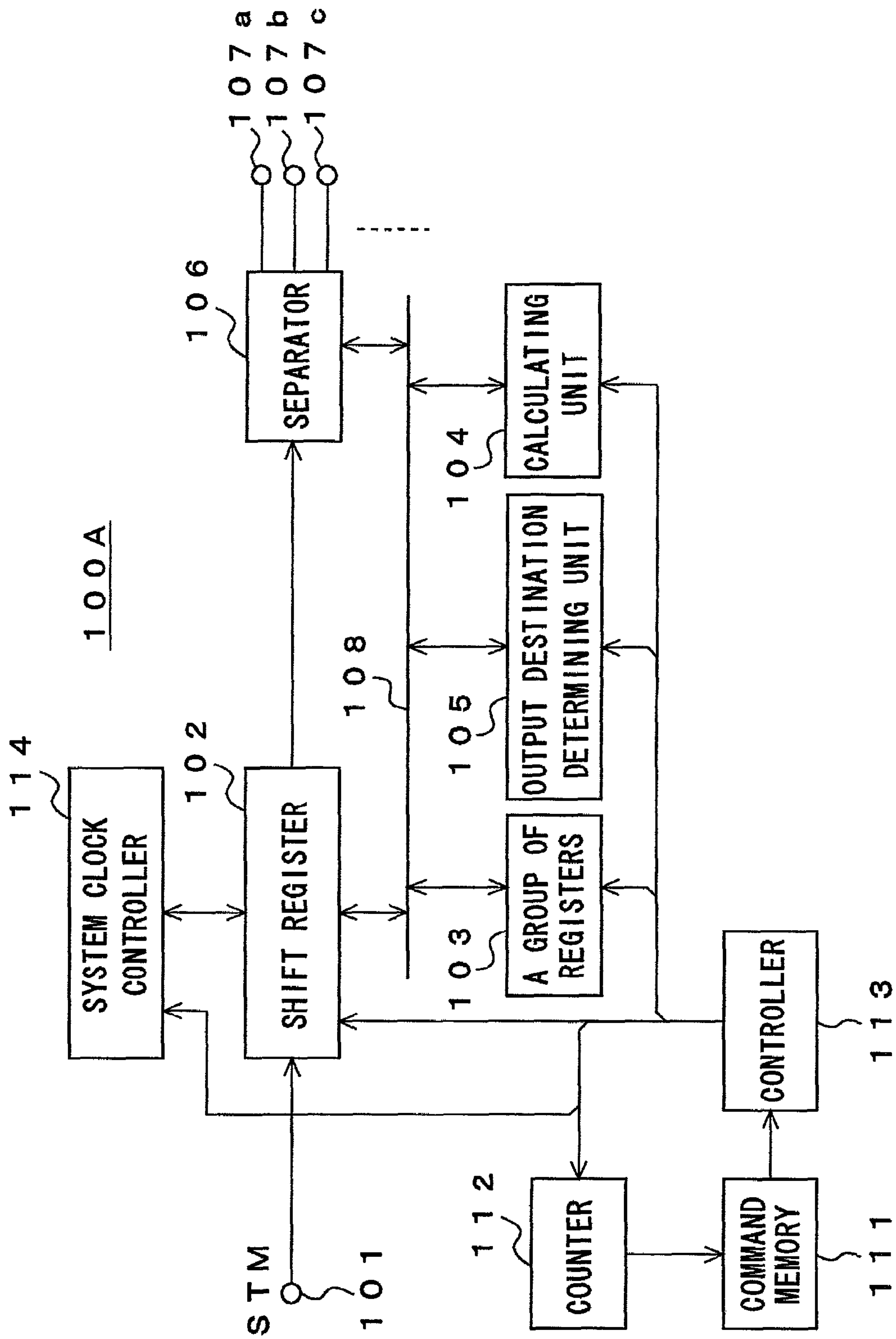
FIG. 1 is a block diagram showing an arrangement of a demultiplexer of the first embodiment.

FIG. 1 illustrates an arrangement of a demultiplexer 100A according to the first embodiment of the present invention. The demultiplexer 100A is arranged for separating desired packets from a bit stream of input digital data which have different types of packets multiplexed for output. The demultiplexer 100A can handle a variety of multiplexed data including the DVB stream, the DSS stream, and the DVD stream.

The demultiplexer 100A comprises an input terminal 101 for receiving a bit stream STM, a shift register 102 for saving and then transferring the bit streams STM received from the input terminal 101, a group of registers 103 for extracting and saving the headers from the bit stream saved in the shift register 102, a calculating unit 104 for analyzing the headers saved in the registers 103, and an output destination determining unit 105 for determining the destination of a packet marked with a packet ID which is carried in each header saved in the registers 103.

The demultiplexer 100A also includes a separator 106 arranged responsive to a result of the calculating unit 104 and a result of the output destination determining unit 105 for separating desired payloads from the bit stream STM received from the shift register 102 and delivering them to the destination. For example, the separator 106 is connected to a set of output terminals 107*a*, 107*b*, 107*c*, and so on. The shift register 102, the registers 103, the calculating unit 104, the output destination determining unit 105, and the separator 106 are connected with a bus 108.

The demultiplexer 100A further includes a command memory 111 for saving micro-codes for assigning particular controlling methods to the different types of the multiplexing, a counter 112 for obtaining the execution address of each micro-code saved in the command memory 111, a controller 113 for controlling the action of each component in response to the micro-code which is read out in a sequence from the command memory 111 with the use of data of the execution address from the counter 112, and a system clock controller 114 for extracting a timing data from the bit stream STM saved in the shift register 102 and using it to control the action of a system clock.

The action of the demultiplexer 100A shown in FIG. 1 will now be explained. In the demultiplexer 100A, the micro-codes corresponding to the multiplexing format of the bit stream STM are read out in a sequence from the command memory 111 and used by the controller 113 controlling the action of each component, allowing the separator 106 to separate desired packets from the bit stream STM and transfer them to the predetermined destination.

The description is continued in case of the bit stream STM of a DVB format.

A bit stream STM received at the input terminal 101 is saved and shifted in the shifter register 102 by the action of a control signal which is produced by the controller 113 from the micro-code received from the command memory 111 . The headers of packets in the bit stream STM saved in the shift register 102 are transferred to the group of the registers 103 when demanded. The headers of packets saved in the registers 103 are analyzed by the calculating unit 104 responding to a control signal from the controller 113. The analyzing process includes the detection of errors and the examination of continuity in the packets.

Upon receiving a control signal from the controller 113, the output destination determining unit 105 compares the PID data in the headers of packets saved in the registers 103 with reference PID data saved in its built-in memory to determine the destination of the packets. Using the result of the error detection and the continuity examination in the calculating unit 104 and an output of the output destination determining unit 105, the separator 106 separates and transfers the payloads of the relevant packets to the destination.

The PCR data of timing information carried in the bit stream STM saved in the shift register 102 is transferred to the system clock controller 114 for controlling the system clock.

Figure 31:
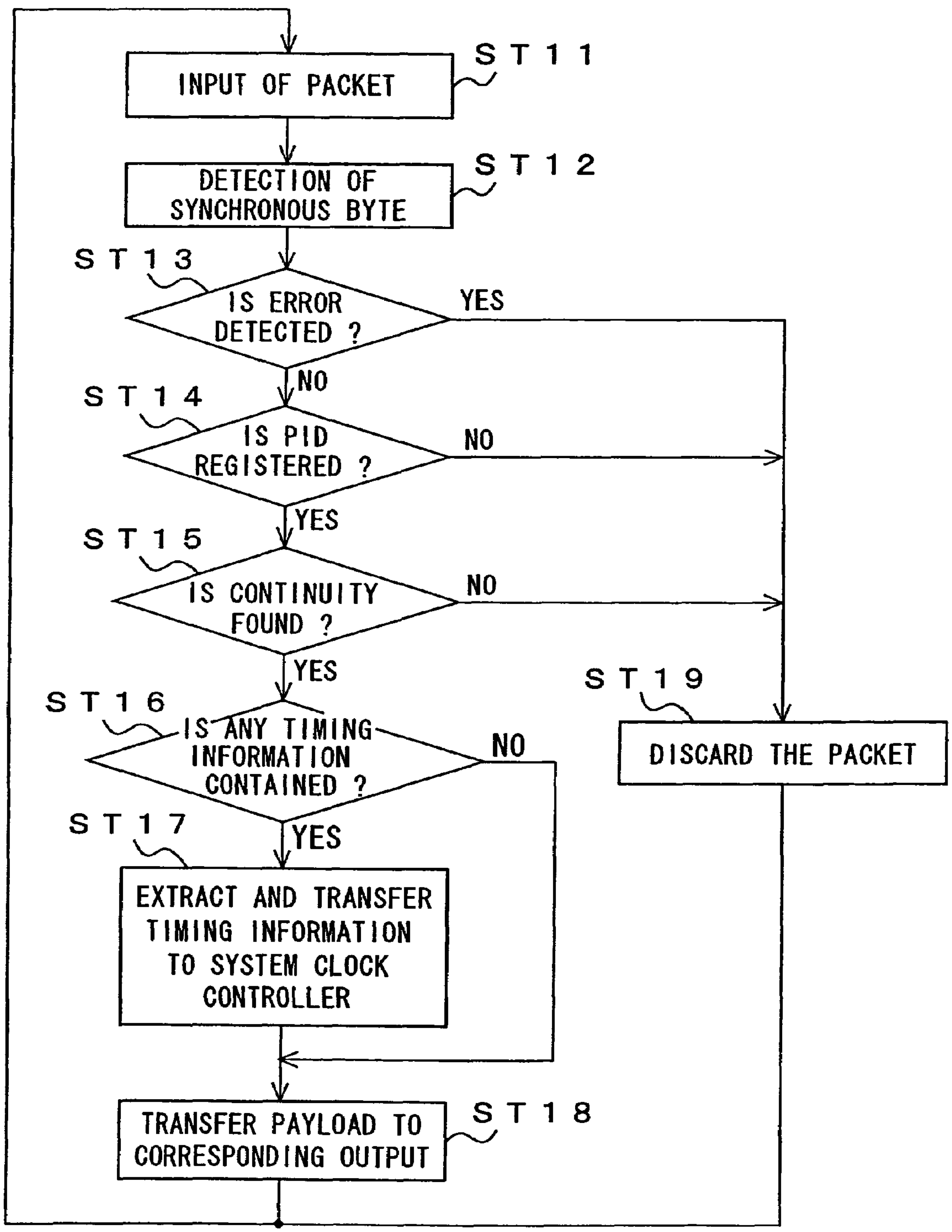
FIG. 31 is a flowchart showing a procedure of processing the DVB packets.
Figure 3:
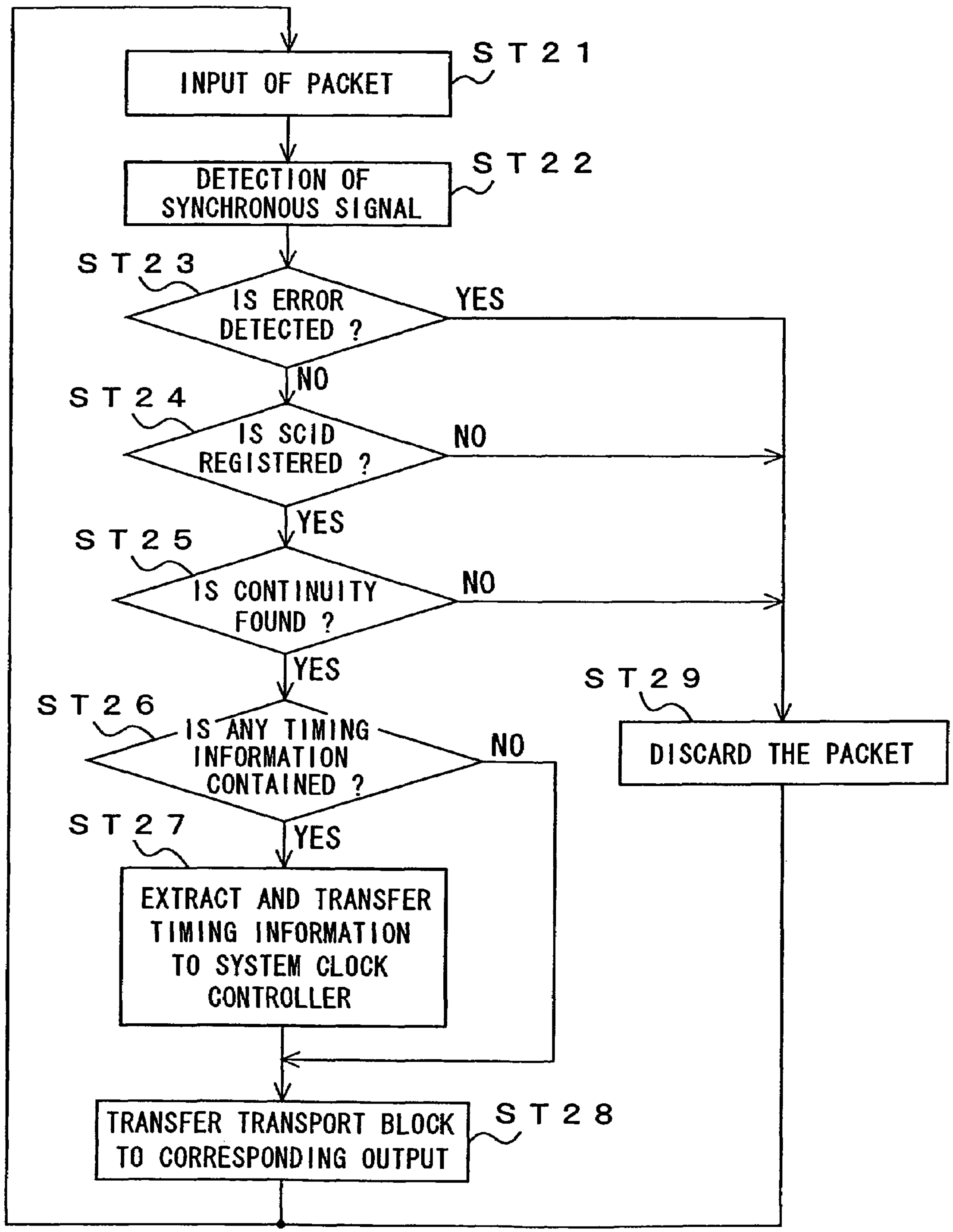

The demultiplexer 100A of this embodiment can perform the same process as of a flowchart of FIG. 31 when the bit stream STM is of the DVB format.

The action will be explained when the bit stream STM is of the DSS format.

A bit stream STM received at the input terminal 101 is saved and shifted in the shifter register 102 by the action of a control signal which is produced by the controller 113 from the micro-code received from the command memory 111. The prefixes (equivalent to the headers of the DVB packets) of packets in the bit stream STM saved in the shift register 102 are transferred to the group of the registers 103 when desired. The prefixes of packets saved in the registers 103 are analyzed by the calculating unit 104 responding to a control signal from the controller 113. The analyzing process includes the detection of errors and the examination of continuity in the packets.

Upon receiving a control signal from the controller 113, the output destination determining unit 105 compares the SCID data in the prefixes of packets saved in the registers 103 with reference SCID data saved in its built-in memory to determine the destination of the packets. Using the result of the error detection and the continuity examination in the calculating unit 104 and an output of the output destination determining unit 105, the separator 106 separates and transfers transport blocks of the relevant packets to the destination.

The RTS data of timing information carried in the bit stream STM saved in the shift register 102 is transferred to the system clock controller 114 for controlling the system clock.

The demultiplexer 100A of this embodiment can perform the same process as of a flowchart of FIG. 32 when the bit stream STM is of the DSS format.

The action will be explained when the bit stream STM is of the DVD format.

A bit stream STM received at the input terminal 101 is saved and shifted in the shifter register 102 by the action of a control signal which is produced by the controller 113 from the micro-code received from the command memory 111. The headers of packs and the headers of PES packets (equivalent to the headers of DVB packets)in the bit stream STM saved in the shift register 102 are transferred to the group of the registers 103 when demanded. The headers saved in the registers 103 are analyzed by the calculating unit 104 responding to a control signal from the controller 113. The analyzing process includes the detection of errors and the like.

Upon receiving a control signal from the controller 113, the output destination determining unit 105 compares the Stream ID data in the PES packets saved in the registers 103 with reference Stream ID data saved in its built-in memory to determine the destination of the packets. Using the result of the error detection in the calculating unit 104 and an output of the output destination determining unit 105, the separator 106 separates and transfers the PES packets to the destination.

The SCR data of timing information carried in the pack header of the bit stream STM saved in the shift register 102 is transferred to the system clock controller 114 for controlling the system clock.

Figure 33:
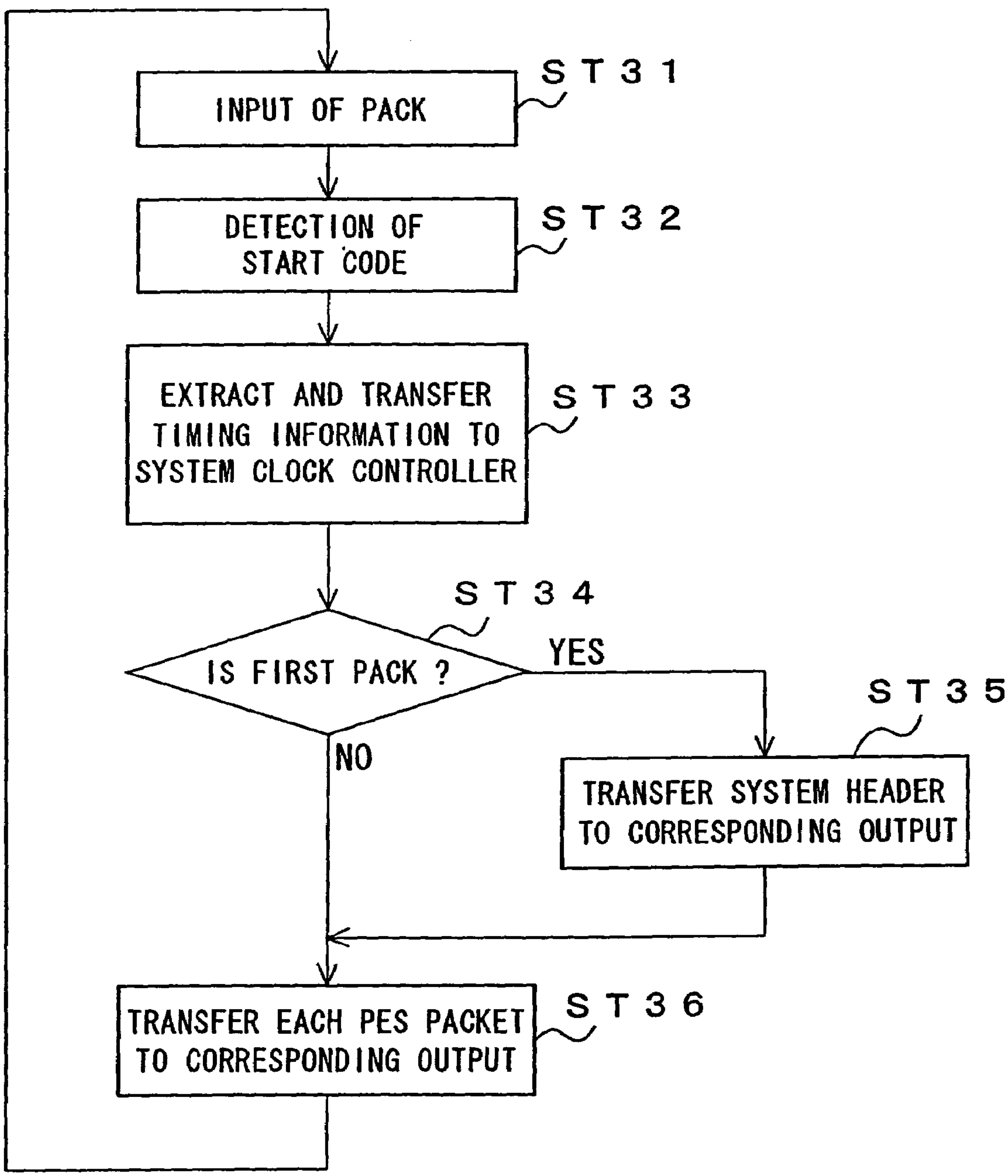
FIG. 33 is a flowchart showing a procedure of processing the DVD packs.

The demultiplexer 100A of this embodiment can perform the same process as of a flowchart of FIG. 33 when the bit stream STM is of the DVD format.

The demultiplexer 100A shown in FIG. 1 is provided with the command memory 111 for saving the micro-codes. As the action of each component is controlled by the micro-codes read out in a sequence from the command memory 111, desired packets can readily be separated from the bit stream STM received at the input terminal 101 and delivered to the corresponding destination. This allows the different types of the multiplexing signal to be handled by modifying the micro-codes read out from the command memory 111, hence contributing to the reduction of the overall size and the cost down of the circuit.

Figure 2:
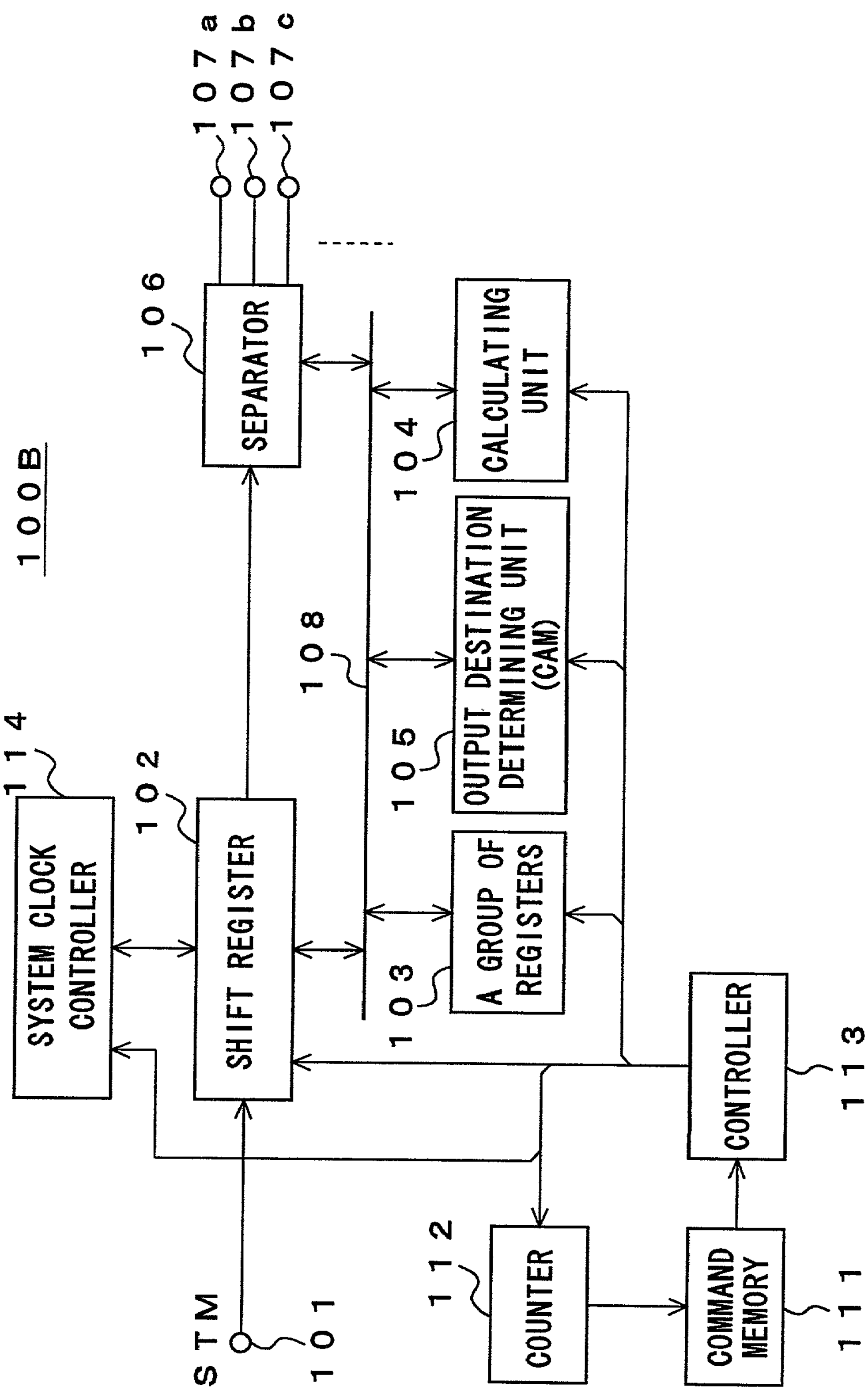
FIG. 2 is a block diagram showing an arrangement of a demultiplexer of the second embodiment.

FIG. 2 illustrates an arrangement of a demultiplexer 100B according the second embodiment of the present invention. The demultiplexer 100B has an output destination determining unit 105 implemented by a contents addressable memory (CAM). The other components are identical to those of the demultiplexer 100A shown in FIG. 1.

Figures 3, 9:
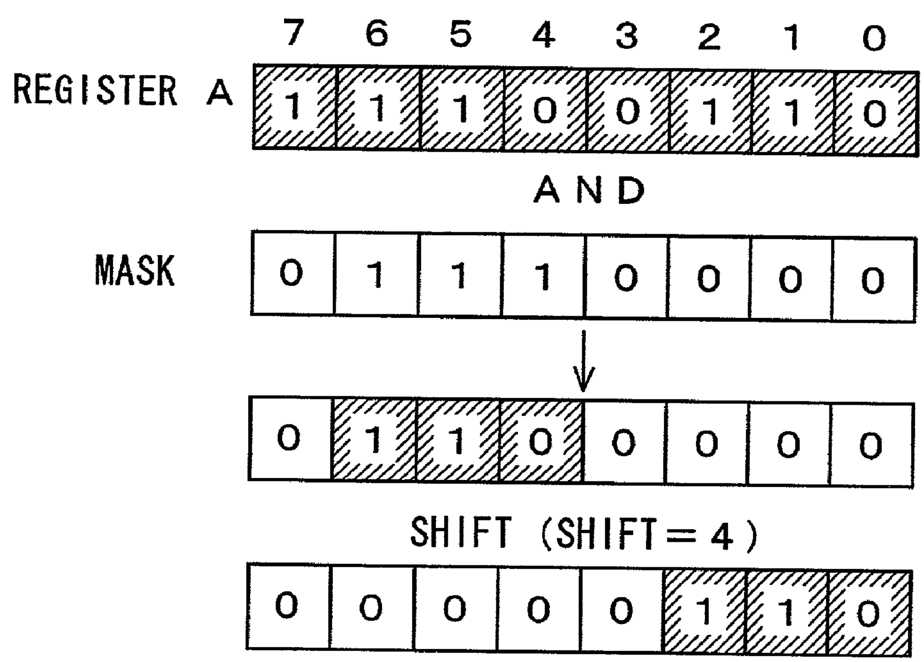
FIG. 3 is a diagram showing a structure of a content addressable memory.
FIG. 9 is a diagram showing a processing action of the bit manipulating unit.

FIG. 3 shows an arrangement of the contents addressable memory provided as the output destination determining unit 105. In this embodiment, the contents addressable memory can be retrieved with the packet ID of each header for reading out the destination and the preceding continuity count to detect the continuity.

Figure 4:
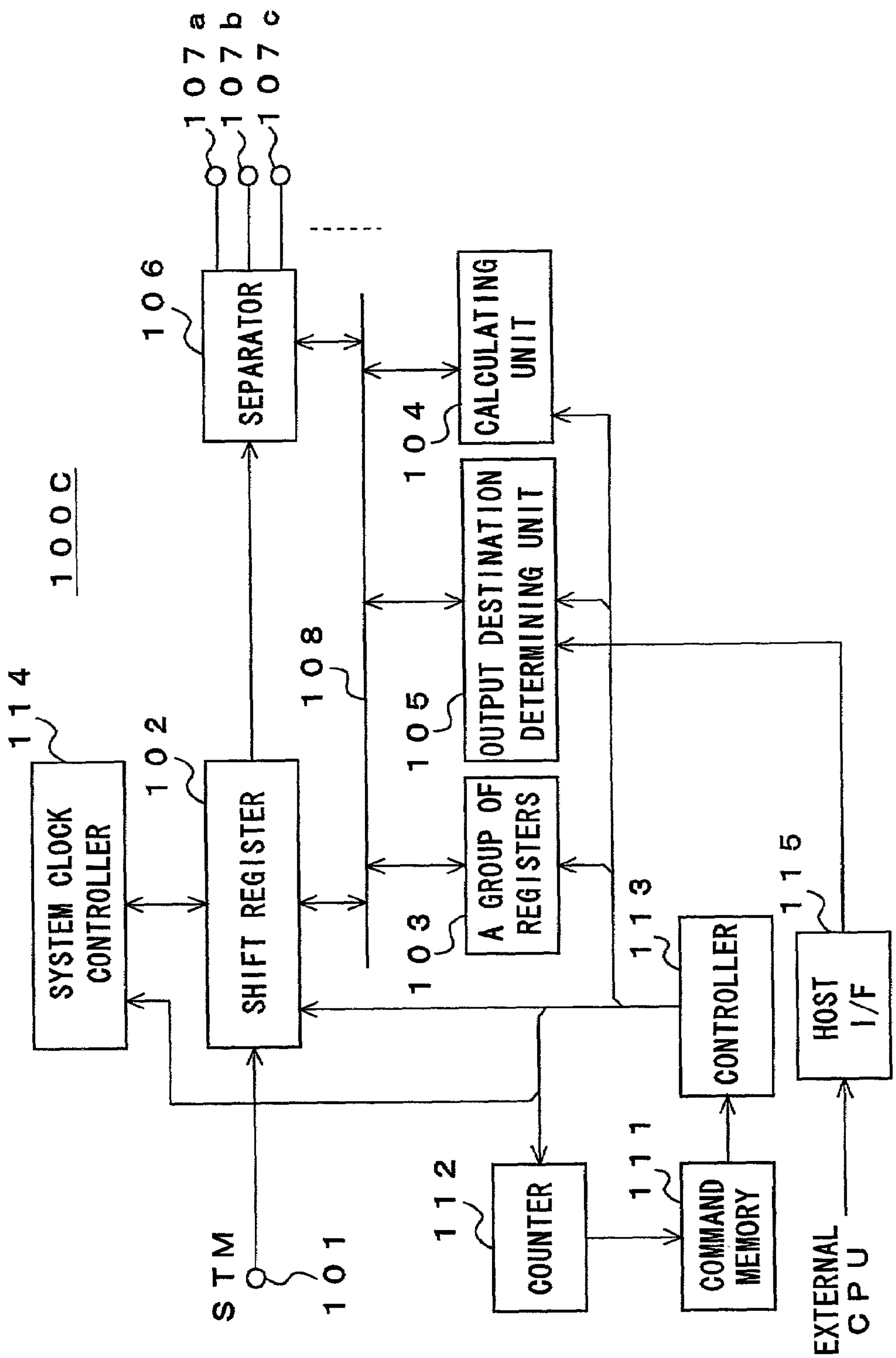
FIG. 4 is a block diagram showing an arrangement of a demultiplexer of the third embodiment.

FIG. 4 illustrates an arrangement of a demultiplexer 100C according to the third embodiment of the present invention. The demultiplexer 100C has an output destination determining unit 105 arranged of which the built-in memory can be written by an external CPU via a host interface 115. The other components are identical to those of the demultiplexer 100A shown in FIG. 1.

In this embodiment, the detailed data of packets in the bit stream STM is transferred to the external CPU. Upon analyzing the detailed data of packets, the external CPU can rewrite the data saved in the built-in memory of the output destination determining unit 105.

Figure 5:
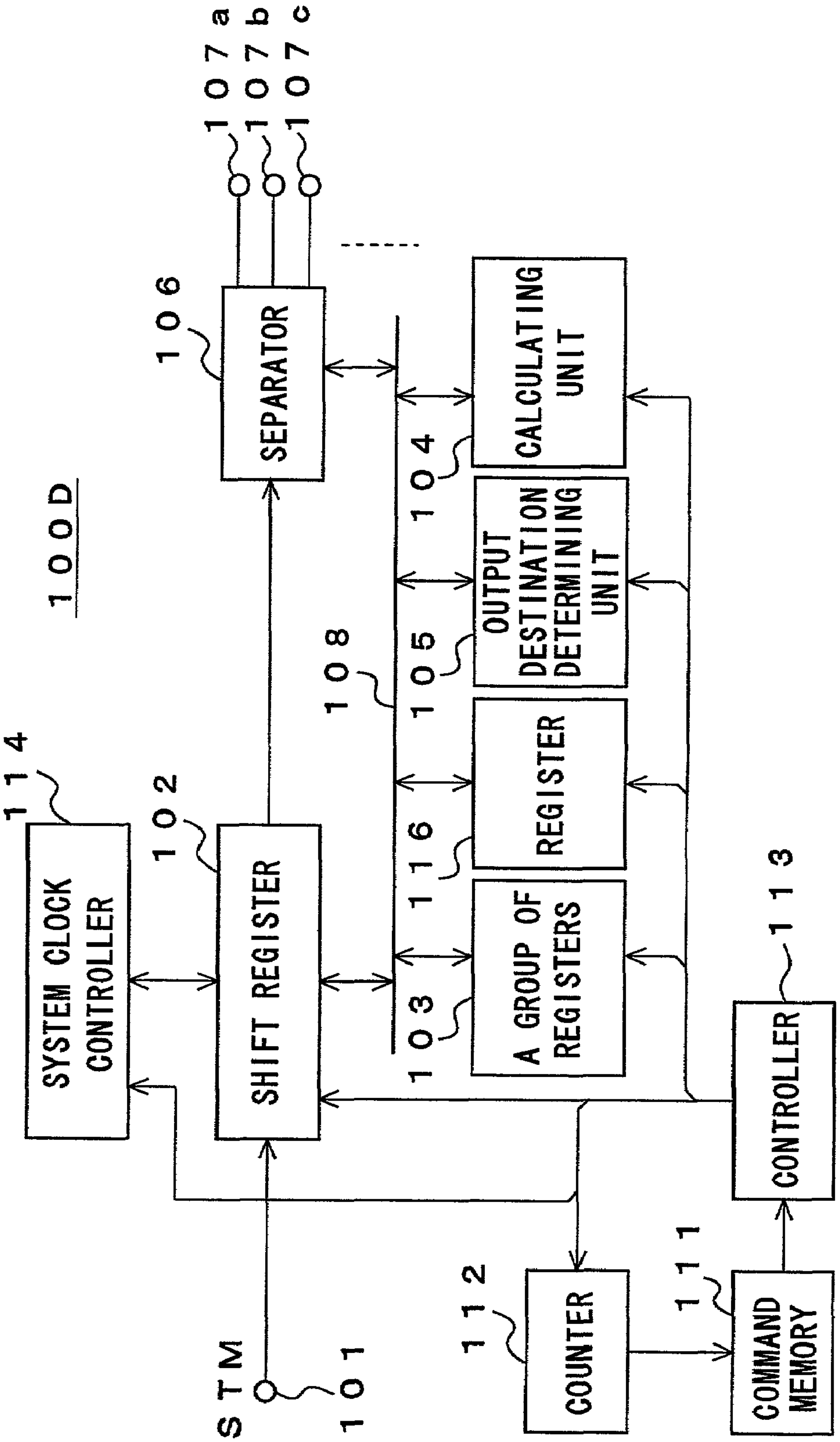
FIG. 5 is a block diagram showing an arrangement of a demultiplexer of the fourth embodiment.

FIG. 5 illustrates an arrangement of a demultiplexer 100D according to the fourth embodiment of the present invention. The demultiplexer 100D has an extra register 116 which serves as a counter for controlling the length of each packet. The other components are identical to those of the demultiplexer 100A shown in FIG. 1.

The DVB and DSS formats contain fixedly 188 bytes and 130 bytes respectively in each packet. When the length of the packet less the length of the header is registered to the register 116, its differential length of the payload or transport block can be output. As the length of the PES packet in the DVD packet is predetermined and registered in the register 116, it can be output.

Figure 6:
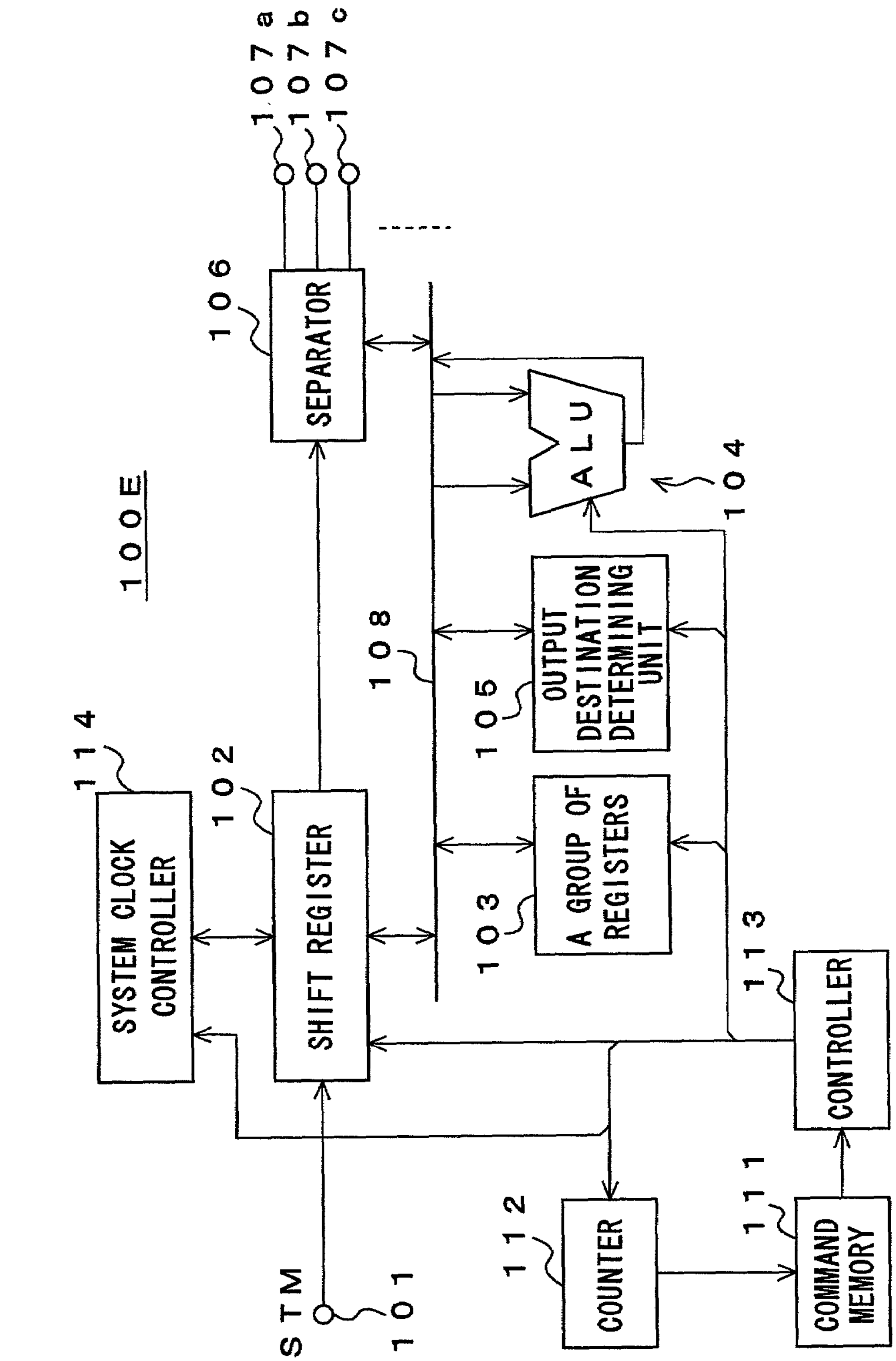
FIG. 6 is a block diagram showing an arrangement of a demultiplexer of the fifth embodiment.

FIG. 6 illustrates an arrangement of a demultiplexer 100E according to the fifth embodiment of the present invention. The demultiplexer 100E has a calculating unit 104 implemented by an arithmetic and logical unit (ALU). The other components are identical to those of the demultiplexer 100A shown in FIG. 1. For detection of any error and examination of the continuity, commands for addition, subtraction, logic sum, and logic product are released. The detection of any error and the examination of the continuity can be conducted by the arithmetic and logical unit.

Figure 7:
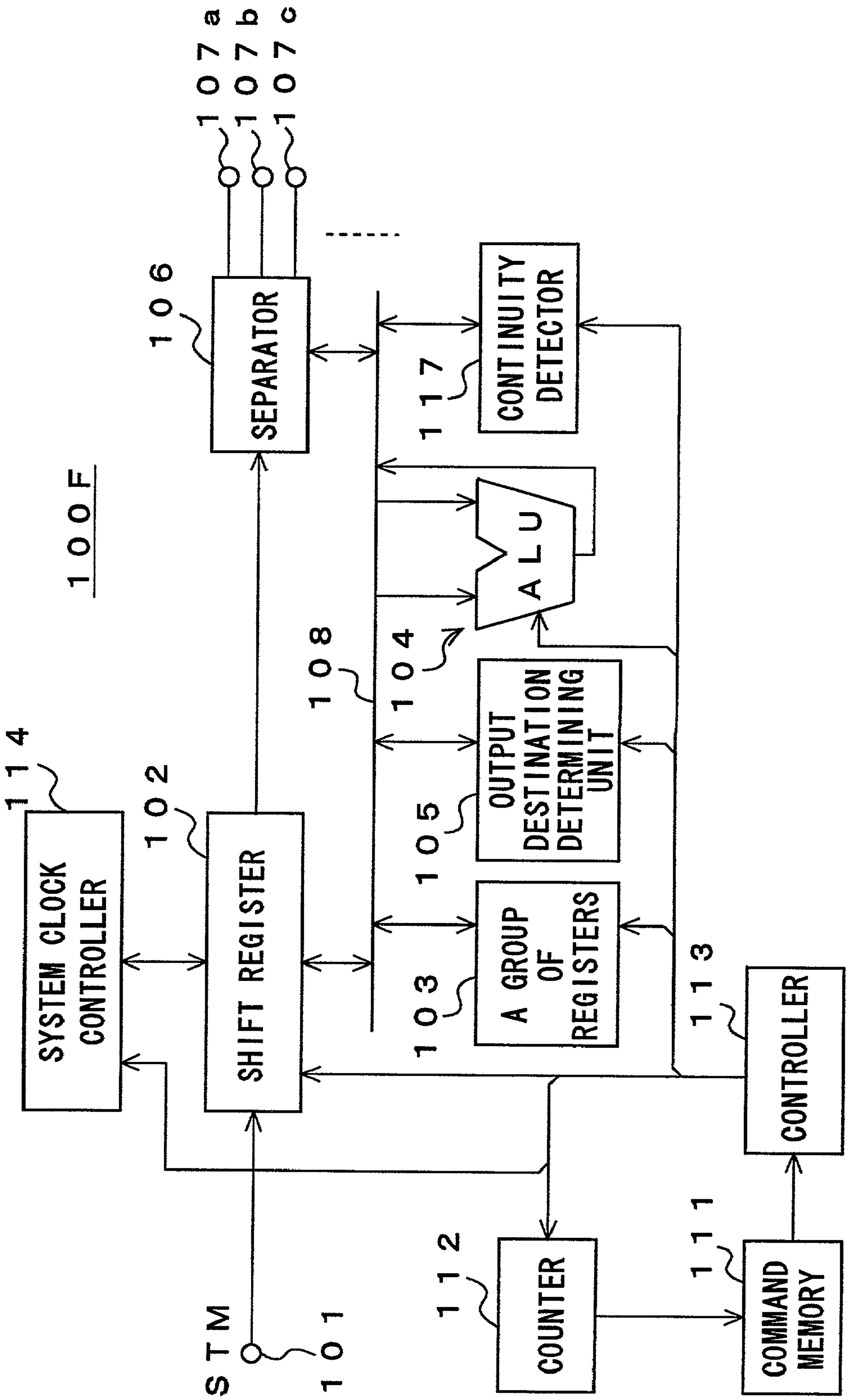
FIG. 7 is a block diagram showing an arrangement of a demultiplexer of the sixth embodiment.

FIG. 7 illustrates an arrangement of a demultiplexer 100F according to the sixth embodiment of the present invention. The demultiplexer 100F has a continuity examining unit 117 for examining the continuity between the packets. The other components are identical to those of the demultiplexer 100E shown in FIG. 6. The continuity examining unit 117 can simultaneously judge the continuity, the non-continuity, and the equality.

Figure 8:
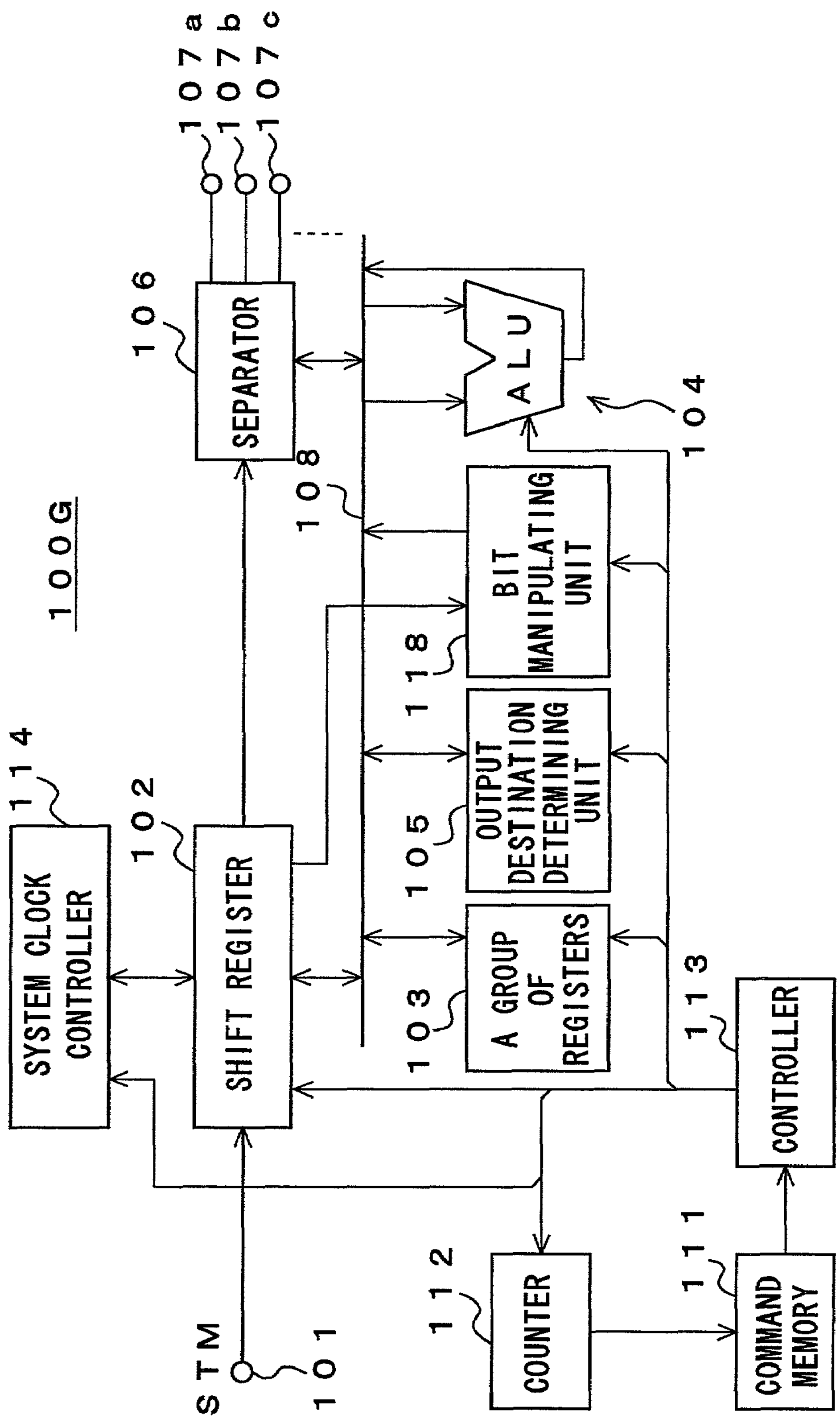
FIG. 8 is a block diagram showing an arrangement of a demultiplexer of the seventh embodiment.

FIG. 8 illustrates an arrangement of a demultiplexer 100G according to the seventh embodiment of the present invention. This demultiplexer 100G has a bit handling unit 118 for handling bits. The other components are identical to those of the demultiplexer 100E shown in FIG. 6.

It is general in the analysis of the header that a particular part of the header is picked up and examined for error checking. The bit handling unit 118 carries out an action of picking the particular part of this data. As shown in FIG. 9, when the upper six to four bits are picked up from the data of eight bits stored in the register A (the least bit being 0), a masking of 01110000 can be used. For alignment of bits, the action of shift can be used. The bit handling unit 118 can perform those actions at one single cycle.

Figure 10:
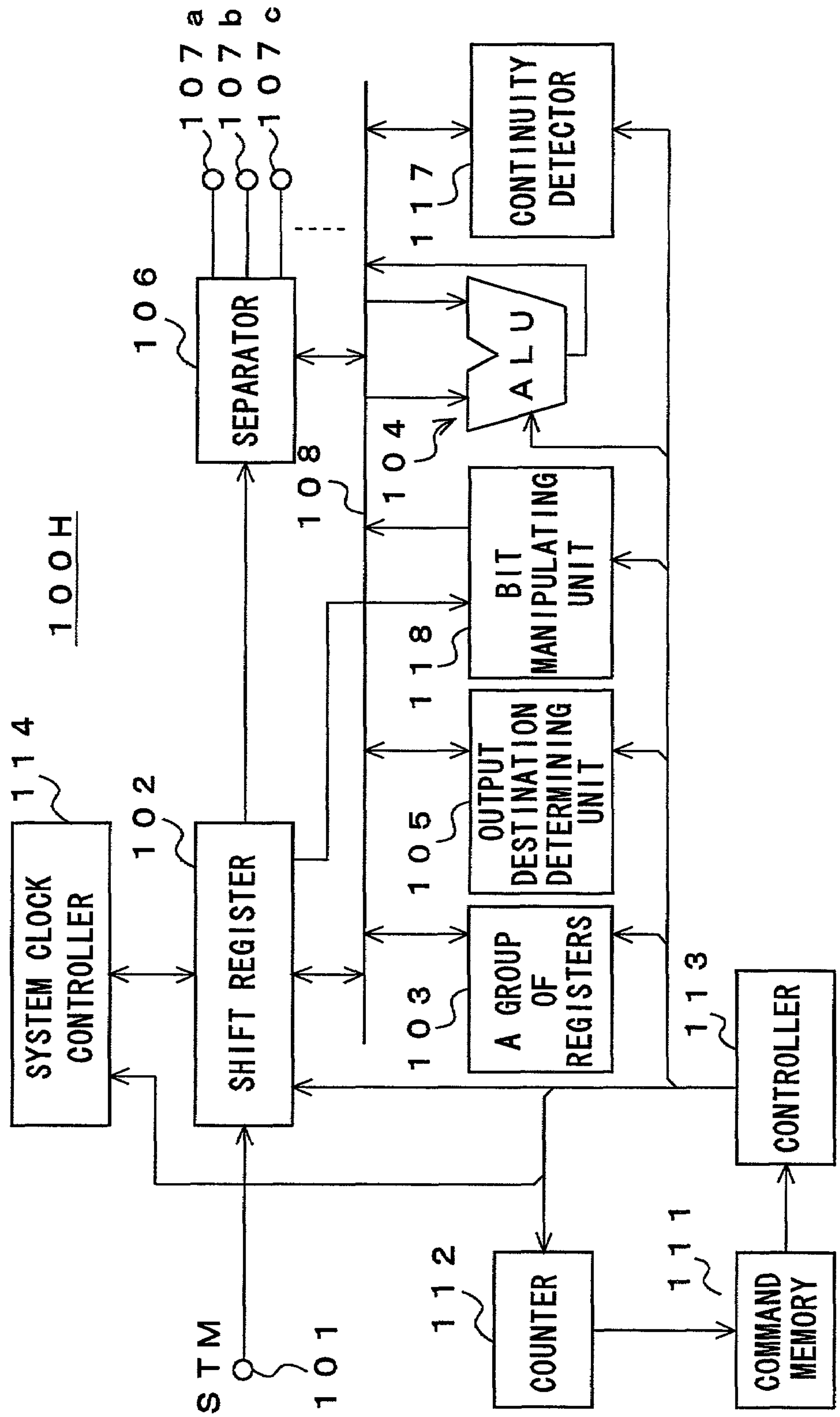
FIG. 10 is a block diagram showing an arrangement of a demultiplexer of the eighth embodiment.

FIG. 10 illustrates an arrangement of a demultiplexer 100H according the eighth embodiment of the present invention. The demultipexer 100H has a calculating unit 104 implemented by an arithmetic and logical unit (ALU), a continuity examining unit 117 for examining the continuity between packets, and a bit handling unit 118 for handling bits. The other components are identical to those of the demultiplexer 100A shown in FIG. 1.

Figure 11:
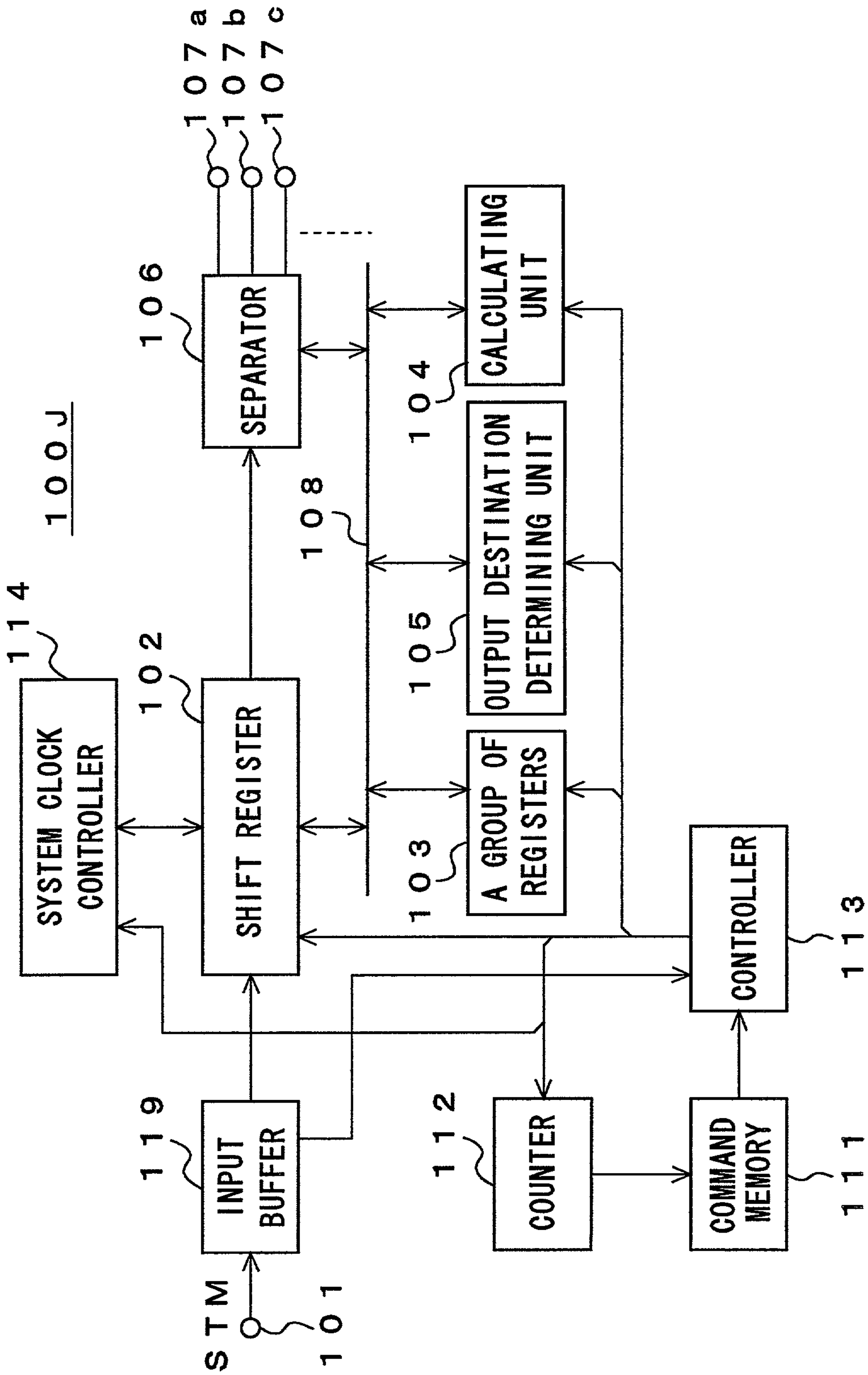
FIG. 11 is a block diagram showing an arrangement of a demultiplexer of the ninth embodiment.

FIG. 11 illustrates an arrangement of a demultiplexer 100J according to the ninth embodiment of the present invention. The demultiplexer 100J has an input buffer 119 connected between the input terminal 101 and the shift register 102 for temporarily saving the bit stream STM received at the input terminal 101. The other components are identical to those of the demodulator 100A shown in FIG. 1.

In the input buffer 119, the read action is carried out with the timing of an internal clock signal and the write action is carried out with the timing of an external clock signal synchronized with the transfer rate of the bit stream STM received at the input terminal 101. This allows the internal clock signal and the external clock signal to be timed with each other.

Figure 12:
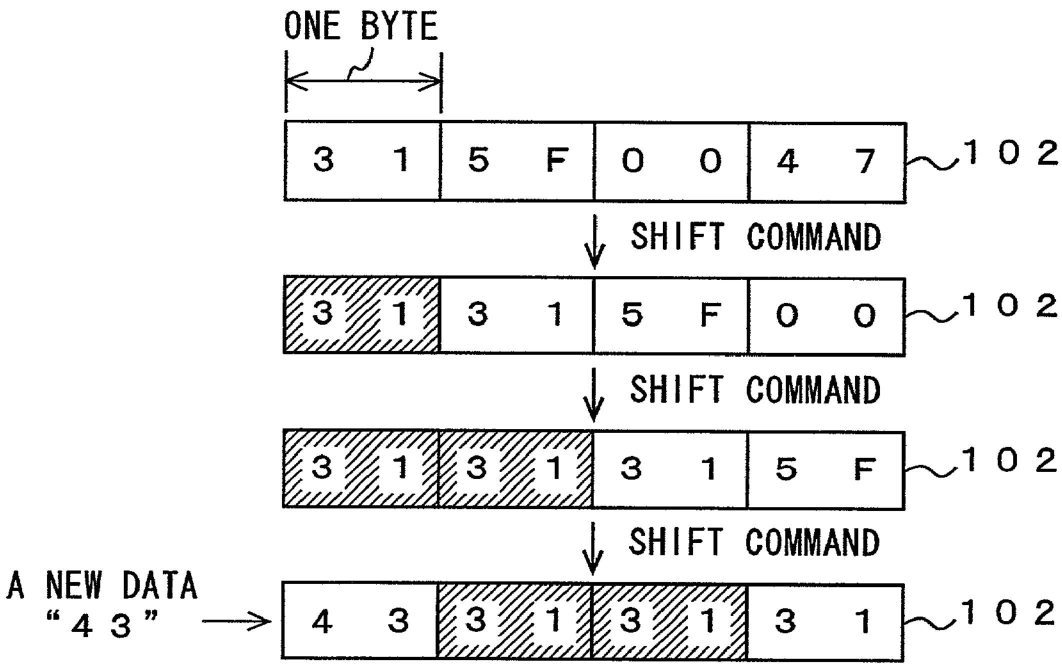
FIG. 12 is a diagram showing a shifting action of the shift register.

For example, the DSS packets and the DVB packets for the digital satellite broadcasting are substantially intercepted in the air. If the shift register 102 conducts a shifting action before a new data is received, unwanted data denoted (by the hatching) in FIG. 12 may be transmitted. For compensation, the shifting action of the shift register 102 is executed in synchronism with the reading of data from the input buffer 119. This will inhibit the shift register 102 from releasing unwanted data.

Figure 13:
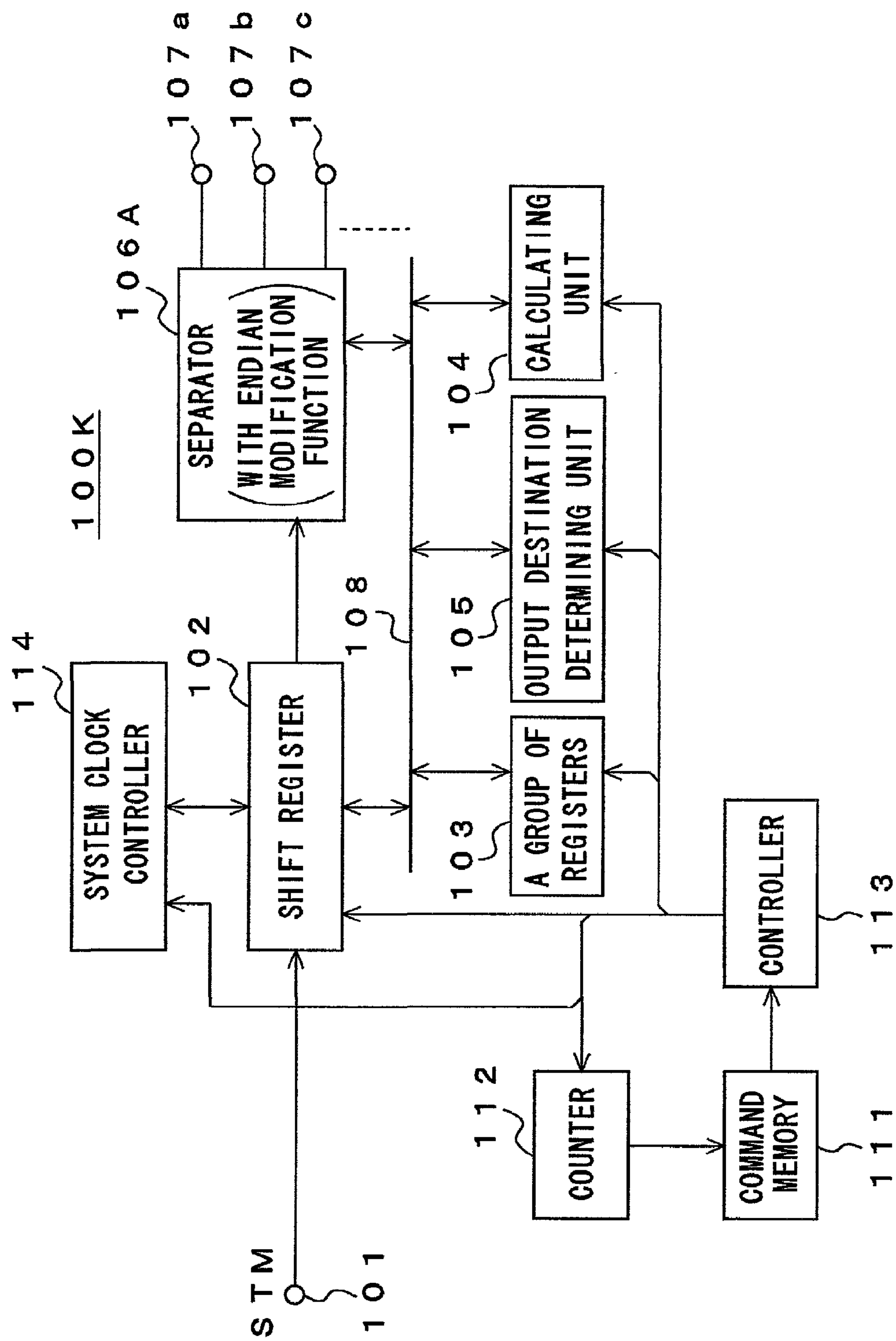
FIG. 13 is a block diagram showing an arrangement of a demultiplexer of the tenth embodiment.

FIG. 13 illustrates an arrangement of a demultiplexer 100K according to the tenth embodiment of the present invention. The demultiplexer 100K has a separator 106A thereof having an endian modifying function which replaces the separator 106 of the demultiplexer 100A of FIG. 1. The other components are identical to those of the demultiplexer 100A shown in FIG. 1.

Figure 14:
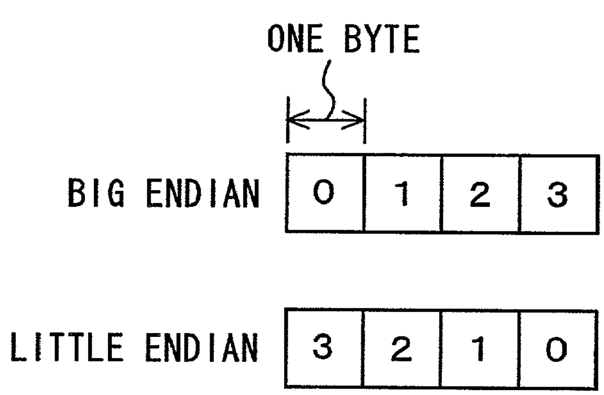
FIG. 14 is a diagram showing a numbering action of the bytes.

The numbering of bytes in a word is classified into two major methods, as shown in FIG. 14, Big Endian mode for incrementing the number of each byte from the left to the right and Little Endian mode for incrementing the same from right to the left. The endian mode used in a decoder has to be changed from one to the other when the bit stream of video or audio data before the decoding process. The separator 106A can modify the endian mode depending on the number in the decoder.

Figure 15:
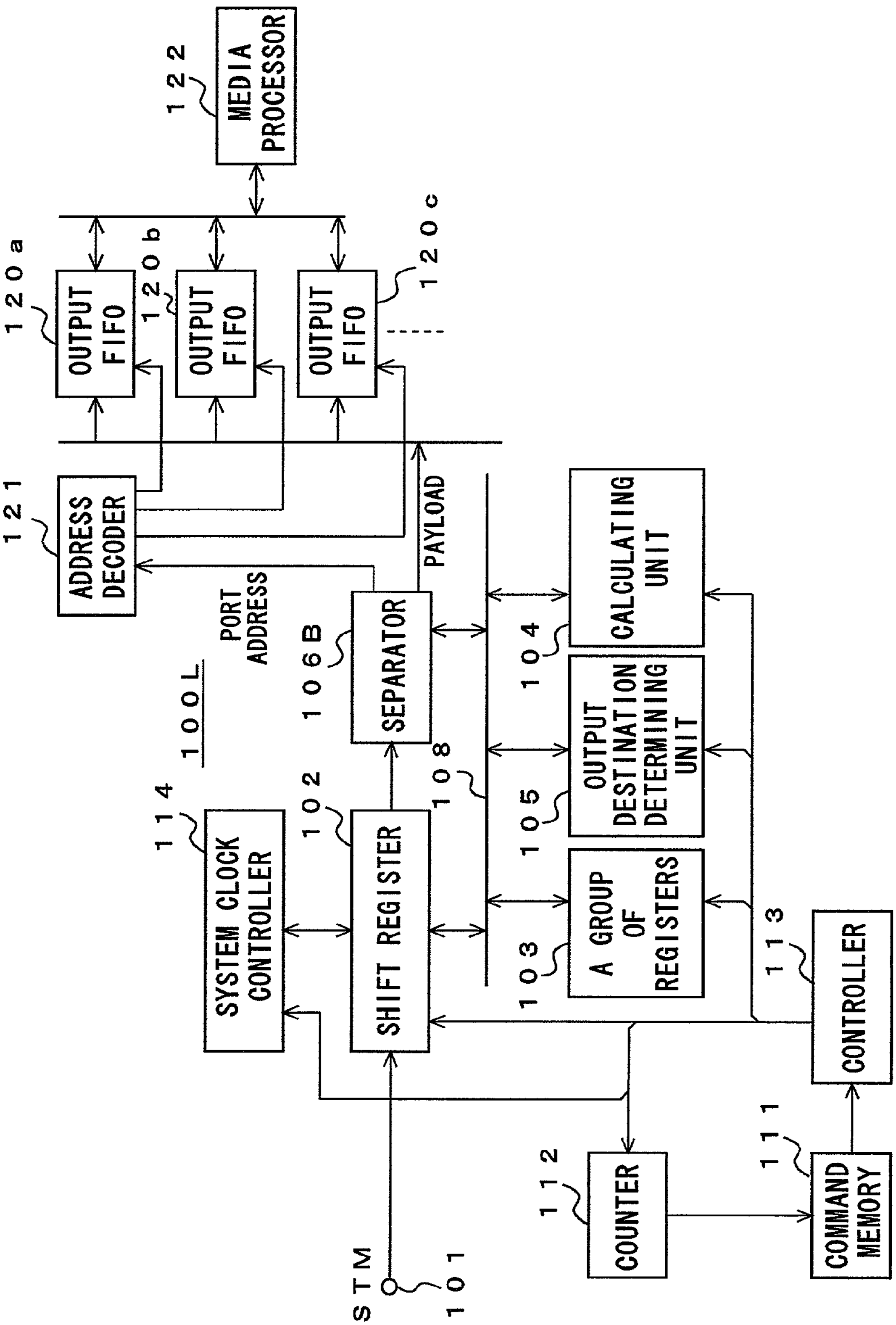
FIG. 15 is a block diagram showing an arrangement of a demultiplexer of the eleventh embodiment.

FIG. 15 illustrates an arrangement of a demultiplexer 100L according to the eleventh embodiment of the present invention. In the other embodiments mentioned above, the payloads separated by the separator 106 are transmitted to the corresponding output terminals 107*a*, 107*b*, 107*c*, and so on determined by the output destination determining unit 105. Each stream of video or audio bits received at the output terminal may be transferred to a dedicated decoder where they are decoded.

The demultiplexer 100L of this embodiment shown in FIG. 15 also includes an array of FIFO memories 120*a*, 120*b*, 120*c*, and so on which serve as the output buffer memories. Desired payloads are separated by a separator 106B from the bit stream STM received from the shift register 102 and saved in the corresponding FIFO memories assigned to the destinations determined by the output destination determining unit 105. The data of the payloads saved in the FIFO memories are then received by one single media processor 122 where they are decoded.

For action, the separator 106B transmits a relevant port address indicating the destination to an address decoder 121 which in turn generates and releases an enable signal to the FIFO memory designated. This allows the FIFO memories assigned to the destinations determined by the output destination determining unit 105 to save the payloads separated by the separator 106B.

Figure 16:
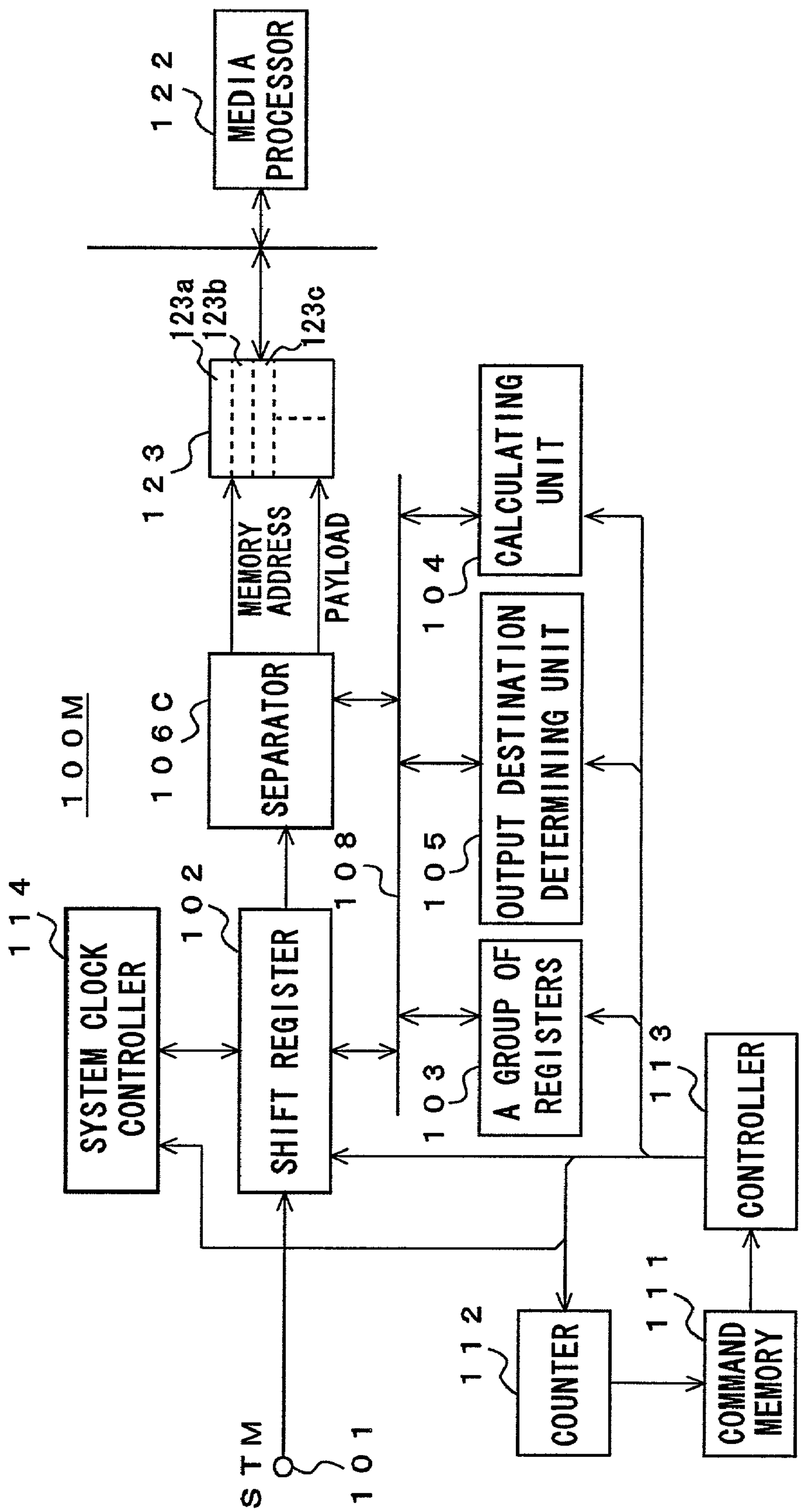
FIG. 16 is a block diagram showing an arrangement of a demultiplexer of the twelfth embodiment.

FIG. 16 illustrates an arrangement of a demultiplexer 100M according to the twelfth embodiment of the present invention. While the demultiplexer 100L shown in FIG. 15 includes an array of the output buffer memories, the demultiplexer 100M of this embodiment has a single output buffer memory 123 implemented by a semiconductor memory, hard disk drive, or the like. The output buffer memory 123 includes an array of memory regions 123*a*, 123*b*, 123*c*, and so on. Desired payloads are separated by the action of a separator 106C from the bit stream STM received from the shifter register 102 and then stored in the corresponding memory regions assigned to the destinations determined by the output destination determining unit 105. The video or audio data stored in the output buffer memory 123 are then decoded in a single media processor 122.

In this embodiment, the output buffer memory 123 receives not only the payloads but also data of memory address from the separator 106C. The data of memory address allows the payloads received from the separator 106C to be stored in the corresponding memory regions assigned to the destinations determined by the output destination determining unit 105.

Figure 17:
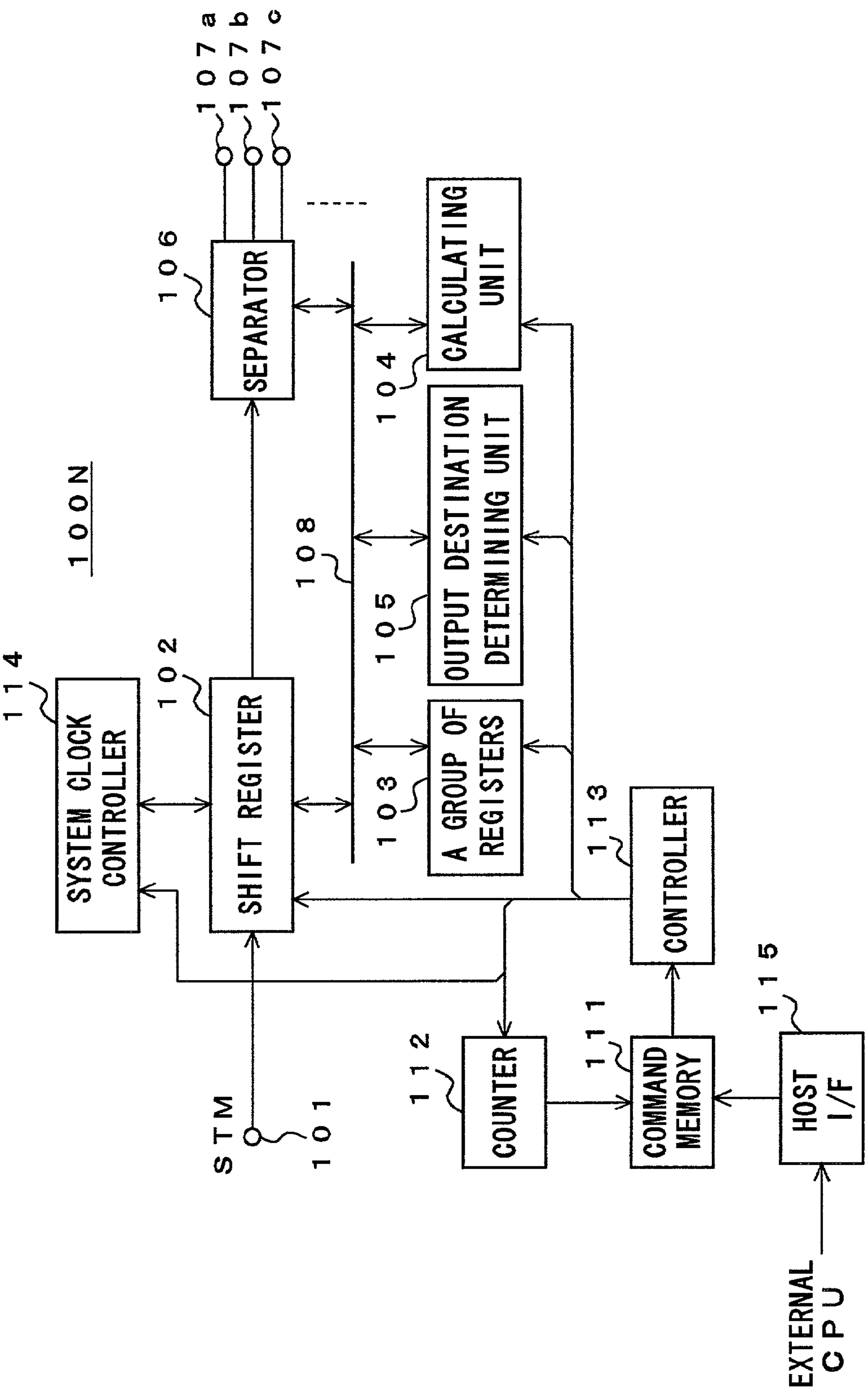
FIG. 17 is a block diagram showing an arrangement of a demultiplexer of the thirteenth embodiment.

FIG. 17 illustrates an arrangement of a demultiplexer 100N according to the thirteenth embodiment of the present invention. The demultiplexer 100N has a command memory 111 arranged for receiving the micro-codes via a host interface 115 from an external CPU. The other components are identical to those of the demultiplexer 100A shown in FIG. 1.

The command memory 111 may save all the micro-codes assigned to the different types of the multiplexing format. However, while its size and production cost are increased, the command memory 111 will allow no rewrite function, thus being unfavorable in the versatility. The demultiplexer 100N of this embodiment permits the command memory 111 to be downloaded with the corresponding micro-codes from the external CPU whenever the multiplexing format is changed from one to another. For example, when the multiplexing format is changed from the DVD format to the DVB format by the user, the micro-codes for the DVB format are downloaded from the external CPU into the command memory 111 via the host interface 115.

Figure 18:
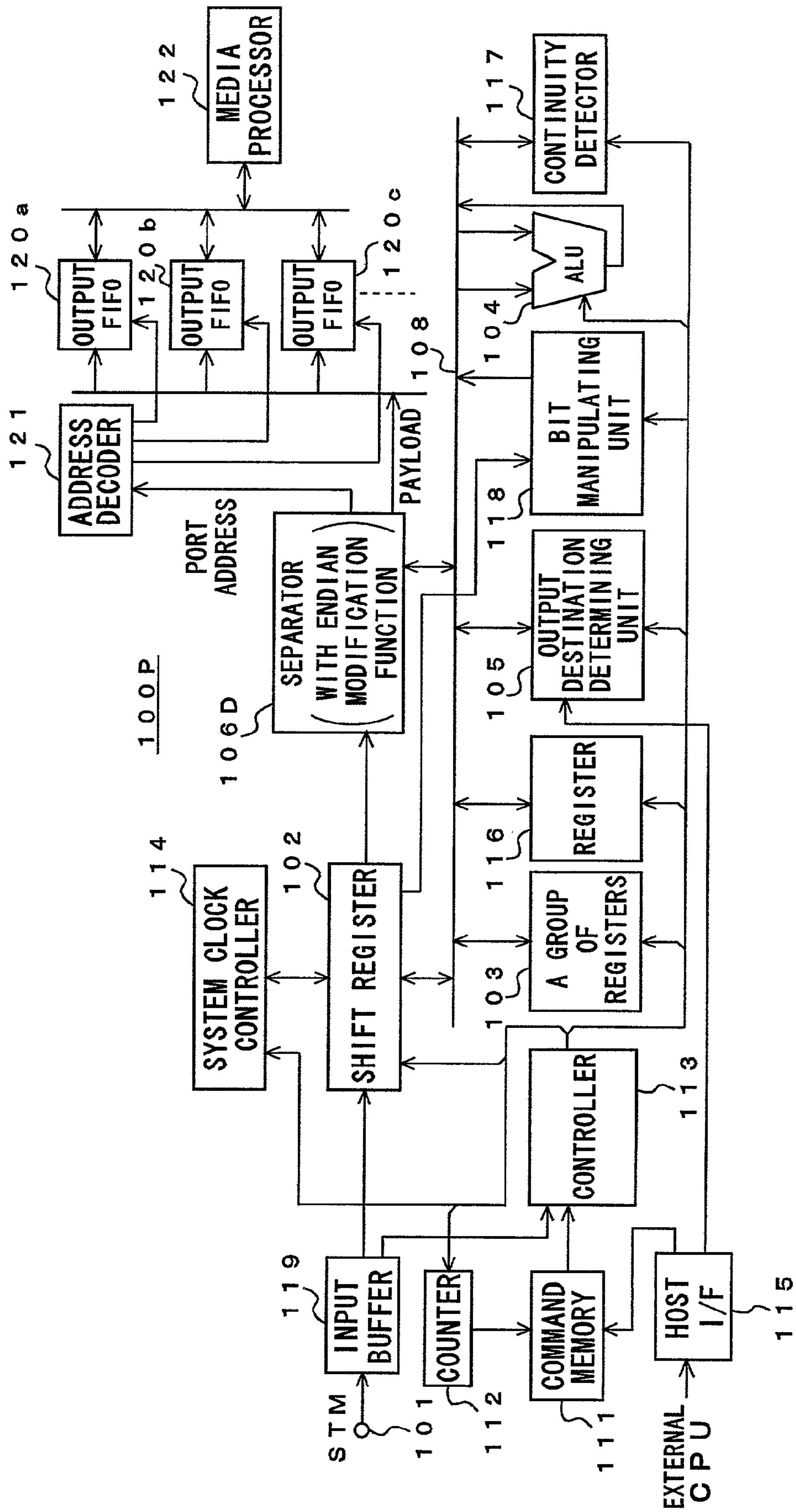
FIG. 18 is a block diagram showing an arrangement of a demultiplexer of the fourteenth embodiment.
Figure 26:
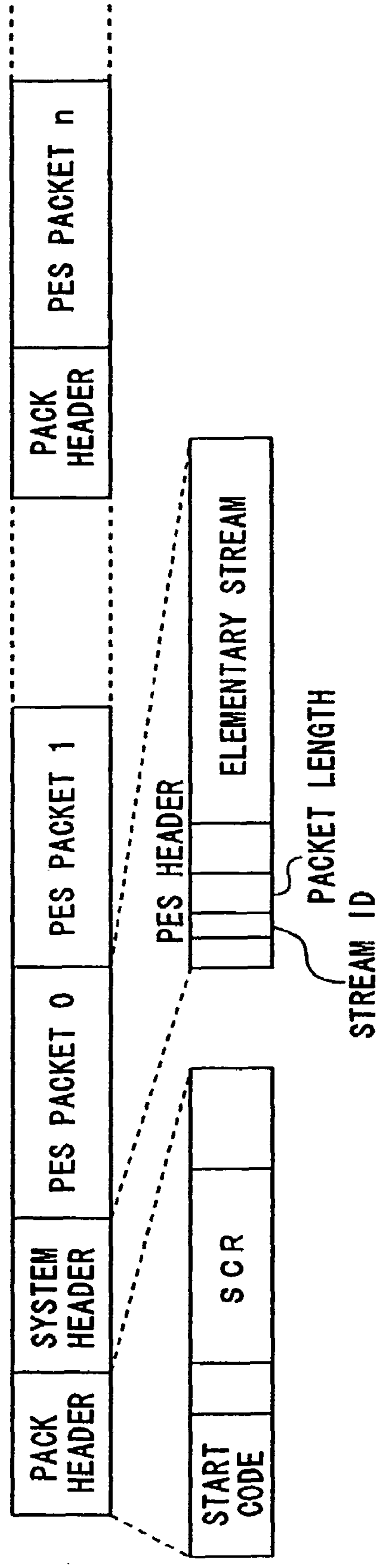
FIG. 26 is a diagram showing a structure of the DVD pack.
Figure 30:
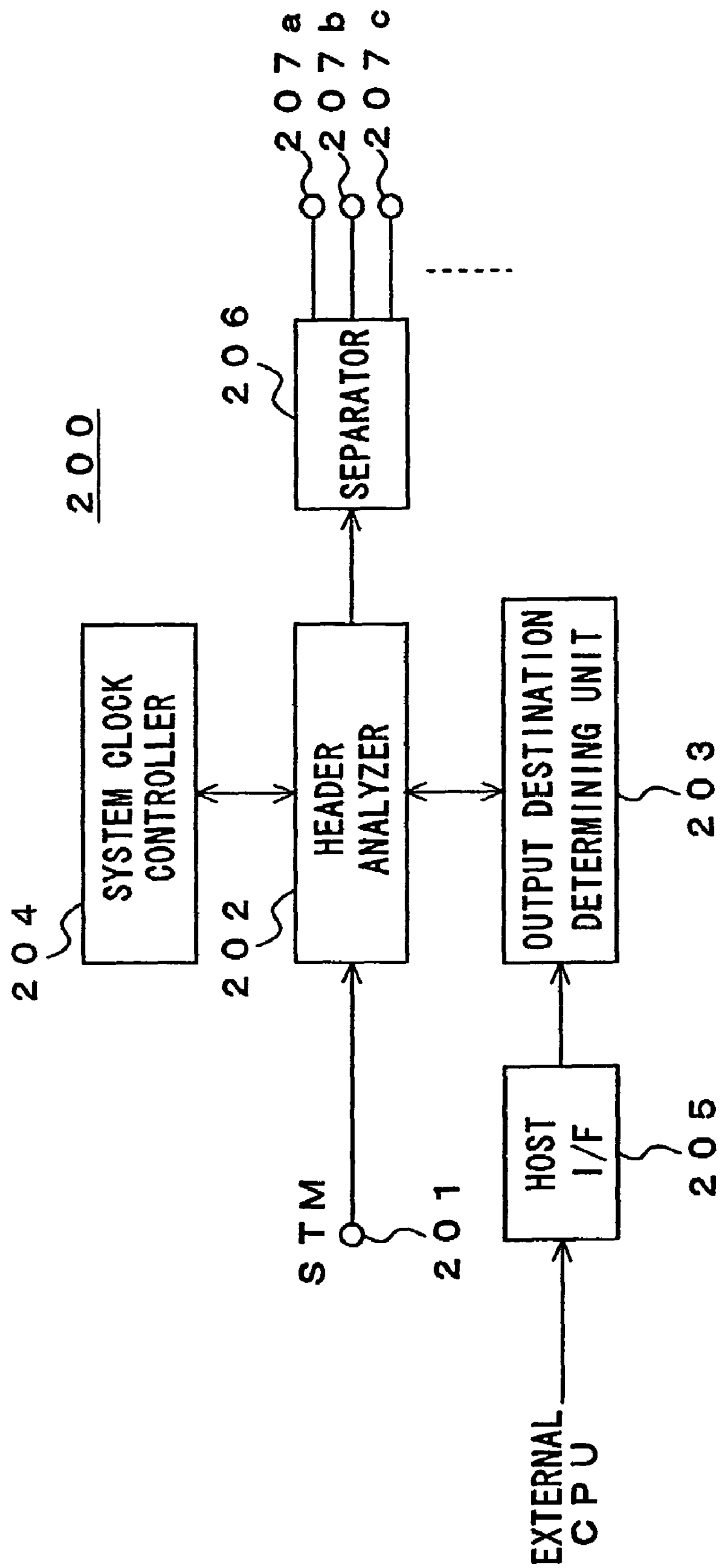
FIG. 30 is a block diagram showing an arrangement of a conventional demultiplexer.

FIG. 18 illustrates an arrangement of a demultiplexer 100P according to the fourteenth embodiment of the present invention.

The demultiplexer 100P has an output destination determining unit 105 implemented by a contents addressable memory (CAM) similar to that of the demultiplexer 100B shown in FIG. 2. Accordingly, as the contents addressable memory is accessed by the packet ID in the header, its contained data of the preceding continuity count can be picked up for examination of the continuity with the destination.

The demultiplexer 100P like the demultiplexer 100C shown in FIG. 4 allows the built-in memory of the output destination determining unit 105 to be rewritten via the host interface 115 from the external CPU. Accordingly, as the external CPU receives and analyzes the detailed information of the packets in the bit stream which configure the bit stream STM, it can rewrite the contents in the built-in memory of the output destination determining unit 105 at this external CPU.

The demultiplexer 100P includes a register 116 which acts as a counter for managing the length of each packet, similar to that of the demultiplexer 100D shown in FIG. 5, a continuity detector 117 for detecting the continuity between packets, similar to that of the demultiplexer 100F shown in FIG. 7, and a calculating unit 104 implemented by an arithmetic logic unit (ALU), similar to that of the demultiplexer 100E shown in FIG. 6.

The demultiplexer 100P like the demultiplexer 100G shown in FIG. 8 also includes a bit manipulating unit 118 for manipulating bits. This allows any desired portion in the header to be extracted with ease before examined in the calculating unit 104 for error checking.

The demultiplexer 100P like the demultiplexer 100J shown in FIG. 11 also includes an input buffer 119 connected between the input terminal 101 and the shift register 102 for temporarily saving the bits stream STM received at the input terminal 101. In the input buffer 119, the read action is carried out with the timing of an internal clock signal and the write action is carried out with the timing of an external clock signal synchronized with the transfer rate of the bit stream STM received at the input terminal 101. At the timing of the input buffer 119 receiving the bit stream STM, the reading of data from the input buffer 119 is performed and the shift register 102 is shifted, hence inhibiting unwanted data from being transmitted across the shift register 102.

The demultiplexer 100P like the demultiplexer 100K shown in FIG. 13 also includes a separator 106D which has an endian modifying function. The separator 106D can modify the endian according to the method of numbering in a decoder for decoding the bit steam of video or audio data.

The demultiplexer 100P like the demultiplexer 100L shown in FIG. 15 also includes an array of FIFO memories 120*a*, 120*b*, 120*c*, and so on which serve as the output buffer memories as a plurality of the output buffer memory. Desired payloads are separated by the separator 106D from the bit stream STM received from the shift register 102 and saved in the corresponding FIFO memories assigned to the destinations determined by the output destination determining unit 105. The video or audio data of the payloads saved in the FIFO memories are then received by one single media processor 122 where they are decoded.

The demultiplexer 100P like the demultiplexer 100N shown in FIG. 17 permits the command memory 111 to be written with the micro-codes received via the host interface 115 from the external CPU. Consequently, whenever the multiplexing format is changed from one to another, its corresponding micro-codes are downloaded from the external CPU to the command memory 111. As a result, the cost up due to the increase of the memory capacity of the command memory 111 can be avoided and different types of the multiplexing format can equally be handled.

In the embodiments mentioned above, the micro-code read out from the command memory 111 is used for generating a control signal (a command) for actuating one or more components at one time. More specifically, the commands are not sequential but in parallel.

For example, the following is a procedure of processing the DVB packets with the use of sequential commands in the demultiplexer 100N shown in FIG. 17, comprising the steps of:

(1) registering a received data to the shift register (a shift command);

(2) examining whether or not the received data is "47" (a comparison command);

(3) when the step (2) judges "yes", advancing to the step (4) or when "no", returning to the step (1) (a branch command);

(4) registering another data (a shift command);

(5) examining "transport_error_indicator" for error (a comparison command);

(6) when the step (5) judges "yes", discarding the data or when "no", advancing to the step (7) (a branch command);

(7) downloading "payload_unit_start_indicator" (a load command);

(8) registering a further data (a shift command);

(9) downloading a PID data (a load command);

(10) examining the PID data for registering (a PID comparison command);

(11) setting the counter with the remaining of a packet length (a load command);

(12) when the step (10) judges "yes", advancing to the step (13) or when "no", discarding the data (a branch command);

(13) registering a further data (a shift command);

(14) subtracting one from the packet length (a subtraction command);

(15) examining "transport_scrambling_control" for scrambling (a comparison command);

(16) when the step (15) judges scrambled, discarding the data or when not scrambled, advancing to the step (17) (a branch command);

(17) downloading "adaptation_field_control" (a load command);

(18) when the step (17) finds "00", discarding the data or when not find "00", advancing to the step (19) (a branch command);

(19) down-loading "continuity_counter" (a load command);

(20) comparing with the preceding "continuity_counter" (a continuity examination command);

(21) when the step (20) finds no continuity, discarding the data or when finds continuity, advancing to the step (22) (a branch command); and

(22) executing the following steps.

On the contrary, the following is a procedure of processing the DVB packets with the use of parallel commands in the demultiplexer 100N shown in FIG. 17, comprising the steps of:

(1) registering a received data to the shift register (a shift command);

(2) while registering another data, examining whether the preceding data is "47" or not and when "yes", advancing to the step (3) or when "no", repeating the step (2) (a shift command and a comparison/branch command);

(3) examining "transport error_indicator" for error checking and when so, discarding the data or when not, advancing to the step (4) (a comparison/branch command);

(4) registering a further data, downloading "payload_unit_start_indicator" (a shift command and a load command);

(5) down-loading the PID data (a load command);

(6) while examining the PID data, setting the counter with the remaining of the packet length (a PID comparison command and a load command);

(7) while registering a further data, subtracting one from the packet length and when the step (6) judges so, advancing to the step (8) or when not, discarding the data (a shift command, a subtraction command, and a branch command);

(8) examining "transport_scrambling_control" and when scrambled, discarding the data or when not, advancing to the step (9) (a branch command);

(9) down-loading "adaptation_field_control" (a load command);

(10) when the step (9) finds "00", discarding the data or when not find "00", advancing to the step (11) (a branch command);

(11) downloading "continuity_counter" (a load command);

(12) comparing with the preceding "continuity_counter" (a continuity examination command);

(13) registering a further data, subtracting one from the packet length, and when the step (12) judges no continuity, discarding the data or when finds continuity, advancing the step (14) (a shift command, a subtraction command, and a branch command); and

(14) executing the following steps.

As the commands are released in parallel, the number of the steps can significantly be reduced. This allows not only the demultiplexing process to be carried out at a higher speed but also the micro-codes to be stored in a less area of the command memory 111. Accordingly, the command memory 111 can be reduced in the storage size and the overall cost of the hardware arrangement will be minimized.

According to the present invention, the command memory is provided for storage of the micro-codes. The micro-codes are read out in a sequence from the command memory and used for controlling the action of each component. As a result, the different types of the multiplexing format can be handled by modifying the micro-codes read out from the command memory, hence contributing to the reduction and the cost down of the circuitry arrangement of the demultiplexer.

What is claimed is:

1. A demultiplexer for separating desired packets for output from an input digital data which has different format packets multiplexed in a given manner, comprising:

a data input for receiving the input digital data;

a shift register for storing and transferring the input digital data received at the data input;

a group of registers for extracting and storing headers of the packets from the input digital data stored in the shift register;

a calculating unit for analyzing the headers of the packets stored in the group of registers;

an output destination determining unit for determining a destination of the packets from a packet identifier which is contained in the headers of the packets stored in the group of registers;

a separator arranged responsive to a result of the calculating action of the calculating unit and an output of the output destination determining unit for separating the desired packets from the input digital data received from the shift register;

a command memory for storing micro-codes provided for processing each multiplexing format including at least a digital video broadcasting (DVB) format, a digital satellite system (DSS) format, and a digital versatile disc (DVD) format;

a counter for determining execution addresses of the micro-codes stored in the command memory;

a controller for controlling the shift register, group of registers, output destination determining unit, calculating unit, and a system clock controller in accordance with the micro-codes read out from the command memory by the execution addresses determined by the counter; and said system clock controller extracting timing data from the input digital data stored in the shift register and controlling the system clock with the timing data.

2. A demultiplexer according to claim 1, wherein the output destination determining unit is a contents addressable memory.

3. A demultiplexer according to claim 1, further comprising a data writing means for writing data for determining the destination in a built-in memory of the output destination determining unit.

4. A demultiplexer according to claim 1, wherein the group of registers includes a register acting as a counter for managing a length of each packet multiplexed in the input digital data.

5. A demultiplexer according to claim 1, wherein the calculating unit is an arithmetic logic unit.

6. A demultiplexer according to claim 1, wherein the calculating unit includes a dedicated circuit for detecting continuity between packets in the input digital data.

7. A demultiplexer according to claim 1, wherein the calculating unit includes a dedicated circuit for subjecting the header of each packet in the input digital data to a bit manipulating process and storing the bit manipulated header in the group of registers.

8. A demultiplexer according to claim 1, wherein the data input includes an input buffer for temporarily saving the input digital data.

9. A demultiplexer according to claim 8, wherein the input buffer when receiving the input digital data has a data read out in synchronism with a shifting action of the shifter register.

10. A demultiplexer according to claim 1, wherein the destination comprises a plurality of buffer memories for storing the packets separated by the separator.

11. A demultiplexer according to claim 1, wherein the destination is a single buffer memory which has an array of storage regions for storing the packets respectively separated by the separator.

12. A demultiplexer according to claim 1, wherein the separator includes a means for modifying a byte endian.

13. A demultiplexer according to claim 1, further comprising:

a data writing means for writing the micro-codes in the command memory.

* * * * *